US010739661B2

(12) United States Patent
Saenger Nayver et al.

(10) Patent No.: US 10,739,661 B2
(45) Date of Patent: Aug. 11, 2020

(54) IR TRANSMITTING COATING FOR ELECTRO-OPTIC ELEMENT

(71) Applicant: Gentex Corporation, Zeeland, MI (US)

(72) Inventors: Mario F. Saenger Nayver, Zeeland, MI (US); Jian Gao, Holland, MI (US); John S. Anderson, Holland, MI (US); George A. Neuman, Holland, MI (US)

(73) Assignee: GENTEX CORPORATION, Zeeland, MI (US)

( * ) Notice: Subject to any disclaimer, the term of this patent is extended or adjusted under 35 U.S.C. 154(b) by 155 days.

(21) Appl. No.: 15/714,512

(22) Filed: Sep. 25, 2017

(65) Prior Publication Data

US 2019/0094642 A1    Mar. 28, 2019

(51) Int. Cl.
*G02F 1/153* (2006.01)
*G02F 1/157* (2006.01)

(52) U.S. Cl.
CPC ............ *G02F 1/157* (2013.01); *G02F 1/1533* (2013.01); *G02F 2203/11* (2013.01)

(58) Field of Classification Search
CPC ......... B60R 1/088; B60R 1/12; B60R 1/1207; B60R 1/04; B60R 2001/1215; B60R 2001/1223; G02F 1/157; G02F 1/161; G02F 1/163; G02F 1/1533; G02F 1/155
USPC ....................................................... 359/267
See application file for complete search history.

(56) References Cited

U.S. PATENT DOCUMENTS 5,928,572 A     7/1999  Tonar et al.
5,998,617 A    12/1999  Srinivasa et al.
6,020,987 A     2/2000  Baumann et al.
6,037,471 A     3/2000  Srinivasa et al.
6,137,620 A    10/2000  Guarr et al.
6,141,137 A    10/2000  Byker et al.
6,193,912 B1    2/2001  Thieste et al.
(Continued)

FOREIGN PATENT DOCUMENTS

WO        9842796 A1   10/1998
WO        9902621 A1    1/1999
(Continued)

OTHER PUBLICATIONS

Sepulveda-Mora et al.,"Figures of Merit for High-Performance Transparent Electrodes Using Dip-Coated Silver Nanowire Networks", Aug. 21, 2012, Journal of Nanomaterials, vol. 2012, Article ID 286104, 7 pages (Year: 2012).*
(Continued)

*Primary Examiner* — William R Alexander
*Assistant Examiner* — Tamara Y. Washington
(74) *Attorney, Agent, or Firm* — Price Heneveld LLP; Bradley D. Johnson

(57) ABSTRACT

The disclosure provides an electro-optic device. The device comprises a first substrate comprising a first surface and a second surface. The device further comprises a second substrate comprising a third surface and a fourth surface. The first substrate and the second substrate form a cavity between the second surface and the third surface. An electrochromic medium is disposed in the cavity. A transflective coating is disposed at the third surface, wherein the transflective coating comprises a multi-layer stack comprising alternating high-index (H) material and low-index (L) material.

19 Claims, 25 Drawing Sheets

(56) References Cited

U.S. PATENT DOCUMENTS

| | | |
|---|---|---|
| 6,241,916 B1 | 6/2001 | Claussen et al. |
| 6,249,369 B1 | 6/2001 | Thieste et al. |
| 6,519,072 B2 | 2/2003 | Nishikitani et al. |
| 6,572,233 B1 | 6/2003 | Northman et al. |
| 7,679,820 B2 | 3/2010 | Wu et al. |
| 8,201,800 B2 | 6/2012 | Filipiak |
| 8,210,695 B2 | 7/2012 | Roth et al. |
| 8,237,909 B2 | 8/2012 | Ostreko et al. |
| 8,264,761 B2 | 9/2012 | Cammenga et al. |
| 8,339,526 B2 | 12/2012 | Minikey, Jr. et al. |
| 8,411,245 B2 | 4/2013 | Lee et al. |
| 8,643,931 B2 | 2/2014 | Cammenga et al. |
| 8,646,924 B2 | 2/2014 | Roth et al. |
| 8,814,373 B2 | 8/2014 | Steel et al. |
| 8,827,517 B2 | 9/2014 | Cammenga et al. |
| 8,885,240 B2 | 11/2014 | Roth et al. |
| 8,925,891 B2 | 1/2015 | Van Huis et al. |
| 8,960,629 B2 | 2/2015 | Rizk et al. |
| 9,022,583 B2 | 5/2015 | Neuman et al. |
| 9,056,584 B2 | 6/2015 | Fish, Jr. et al. |
| 9,174,577 B2 | 11/2015 | Busscher et al. |
| 9,244,249 B2 | 1/2016 | Kim et al. |
| 9,316,347 B2 | 4/2016 | Roth |
| 9,341,914 B2 | 5/2016 | McCabe et al. |
| 9,529,214 B2 | 12/2016 | Neuman et al. |
| 2006/0050356 A1 | 3/2006 | Varaprasad et al. |
| 2012/0327234 A1 | 12/2012 | Fish, Jr. et al. |
| 2015/0309314 A1 | 10/2015 | Border et al. |
| 2017/0061110 A1 | 3/2017 | Wright et al. |
| 2017/0177935 A1 | 6/2017 | Weller et al. |

FOREIGN PATENT DOCUMENTS

| | | |
|---|---|---|
| WO | 2014052658 A1 | 4/2014 |
| WO | 2017127483 A1 | 7/2017 |

OTHER PUBLICATIONS

Shim et al., "Transparent Conductors from Layer-by-Layer Assembled SWNT Films: Importance of Mechanical Properties and a New Figure of Merit", Jun. 16, 2010, American Chemical Society, vol. 4, No. 7, pp. 3725-3734 (Year: 2010).*

Commonly assigned co-pending U.S. Appl. No. 15/443,164, filed Feb. 27, 2017.

Commonly assigned co-pending U.S. Appl. No. 62/463,218, filed Feb. 24, 2017.

The International Search Report and the Written Opinion of the International Searching Authority, Application No. PCT/IB 2018/057222, dated Dec. 13, 2018 (9 pages).

* cited by examiner

TABLE 23. Optical and sheet resistance parameters for electro-optic assemblies 14 with $Y_r$ = 70% and $\lambda_{NIR}$ = 820 nm

| Nr. | Structure | Insulator stack | $Y_t$ (%) | Abs. (%) | $T_{NIR}$ (%) | $a^*_r$ | $b^*_r$ | $a^*_t$ | $b^*_t$ | $R_s$ ($\Omega$/sq) | SF | FOM | $M_1=M_2$ (nm) | $l_1=l_3$ (nm) | $l_2$ (nm) | FWOT @ 550nm ($l_1+l_2+l_3$) | Max $\Delta C^*_r$ (0° to 60°) |
|---|---|---|---|---|---|---|---|---|---|---|---|---|---|---|---|---|---|
| 1 | MIM | SiO2 | 16.8 | 13.2 | 47.7 | -9.1 | 36.5 | 14.0 | -40.5 | 2.1 | 4.2 | 22.7 | 14.4 | 0 | 212.4 | 0.57 | 22.33 |
| 2 | MIM | TiO2 | 19.0 | 11.0 | 47.4 | -12.1 | 38.3 | 17.3 | -39.5 | 2.0 | 3.7 | 23.7 | 15.0 | 0 | 115.8 | 0.49 | 16.56 |
| 3 | MIM | SiO2/ITO/SiO2 | 18.3 | 11.7 | 55.5 | -7.0 | 14.9 | 7.7 | -15.5 | 2.7 | 3.8 | 20.6 | 11.1 | 56.0 | 56.9 | 0.51 | 5.02 |
| 4 | MIM | SiO2/TiO2/SiO2 | 20.2 | 9.8 | 58.2 | -7.1 | 6.1 | 7.1 | -2.3 | 3.0 | 3.5 | 19.4 | 10.1 | 49.5 | 44.6 | 0.45 | 2.93 |
| 5 | Mi | SiO2/TiO2/SiO2 | 21.1 | 8.9 | 14.9 | -3.7 | 6.9 | -0.5 | -9.4 | 3.0 | 3.3 | 5.0 | 20.2 | 73.9 | 29.6 | 0.52 | 2.73 |

FIG. 13

TABLE 24. Optical and sheet resistance parameters for electro-optic assembly 14 with a variable reflectance MIMI transflector and $\lambda_{NIR}$= 820 nm

| Nr. | $Y_r$ (%) | $Y_t$ (%) | Abs. (%) | $T_{NIR}$ (%) | $a^*_r$ | $b^*_r$ | $a^*_t$ | $b^*_t$ | $R_s$ (Ω/sq) | SF | FOM | $l_4$ (nm) | $M_1=M_2$ (nm) | $l_1=l_3$ (nm) | $l_2$ (nm) | FWOT @ 550nm ($l_1+l_2+l_3$) | Max $\Delta C^*_r$ (0° to 60°) |
|---|---|---|---|---|---|---|---|---|---|---|---|---|---|---|---|---|---|
| 1 | 80.0 | 4.5 | 15.5 | 37.2 | -3.0 | 3.3 | 4.3 | -2.3 | 1.5 | 17.8 | 24.8 | 40.1 | 20.7 | 59.1 | 47.4 | 0.52 | 2.89 |
| 2 | 75.0 | 9.7 | 15.3 | 45.7 | -2.9 | 2.9 | 3.6 | 2.0 | 1.8 | 7.7 | 25.4 | 36.0 | 16.7 | 60.4 | 42.5 | 0.50 | 5.29 |
| 3 | 70.0 | 15.1 | 14.9 | 50.2 | -2.9 | 2.4 | 2.8 | 4.2 | 2.1 | 4.6 | 23.9 | 33.0 | 14.5 | 63.5 | 36.9 | 0.50 | 6.98 |
| 4 | 65.0 | 20.5 | 14.5 | 53.0 | -2.8 | 1.9 | 2.0 | 5.0 | 2.3 | 3.2 | 23.0 | 30.9 | 13.0 | 67.6 | 31.1 | 0.49 | 9.11 |
| 5 | 60.0 | 25.6 | 14.4 | 55.9 | -2.7 | 1.5 | 1.4 | 5.0 | 2.5 | 2.3 | 22.4 | 30.5 | 12.1 | 73.2 | 24.8 | 0.49 | 8.14 |
| 6 | 55.0 | 31.2 | 13.8 | 58.0 | -2.6 | 0.8 | 0.6 | 5.7 | 2.6 | 1.8 | 22.3 | 29.9 | 11.7 | 73.6 | 22.8 | 0.49 | 9.10 |

FIG. 19

TABLE 25. Optical and sheet resistance parameters for electro-optic assembly 14 with a variable reflectance IMIM transflector and $\lambda_{NIR}$= 820 nm

| Nr. | $Y_r$ (%) | $Y_t$ (%) | Abs. (%) | $T_{NIR}$ (%) | $a^*_r$ | $b^*_r$ | $a^*_t$ | $b^*_t$ | $R_s$ (Ω/sq) | SF | FOM | $I_0$ (nm) | $M_1=M_2$ (nm) | $I_1=I_3$ (nm) | $I_2$ (nm) | FWOT @ 550nm ($I_1+I_2+I_3$) | Max Δ$C^*_r$ (0° to 60°) |
|---|---|---|---|---|---|---|---|---|---|---|---|---|---|---|---|---|---|
| 1 | 80.0 | 9.0 | 11.0 | 45.6 | -2.6 | 5.1 | -6.2 | 2.3 | 1.9 | 8.9 | 24.0 | 142.8 | 15.5 | 51.9 | 52.8 | 0.49 | 3.62 |
| 2 | 75.0 | 14.5 | 10.5 | 52.0 | -1.5 | 2.9 | -7.8 | 7.3 | 2.3 | 5.2 | 22.6 | 141.6 | 12.9 | 50.3 | 51.5 | 0.48 | 4.15 |
| 3 | 70.0 | 19.5 | 10.5 | 55.7 | -0.5 | 0.7 | -8.8 | 11.2 | 2.7 | 3.6 | 20.6 | 141.2 | 11.2 | 56.8 | 42.9 | 0.48 | 4.62 |
| 4 | 65.0 | 24.4 | 10.6 | 56.9 | 0.0 | 0.0 | -8.8 | 11.6 | 2.9 | 2.7 | 19.6 | 142.4 | 10.5 | 71.4 | 28.0 | 0.50 | 6.01 |
| 5 | 60.0 | 29.4 | 10.6 | 57.6 | 0.0 | 0.0 | -8.0 | 10.2 | 3.0 | 2.0 | 19.2 | 144.2 | 10.1 | 81.1 | 18.7 | 0.51 | 7.23 |
| 6 | 55.0 | 34.5 | 10.5 | 58.7 | 0.0 | 0.0 | -7.3 | 8.7 | 3.2 | 1.6 | 18.3 | 145.1 | 9.5 | 87.2 | 13.1 | 0.52 | 8.68 |

FIG. 20

TABLE 25. Optical and sheet resistance parameters for electro-optic assembly 14 with a variable reflectance MIMI transflector, variable $\lambda_{NIR}$, and constant reflectance at $Y_r = 70\%$

| Nr. | $\lambda_{NIR}$ (nm) | $Y_t$ (%) | Abs. (%) | $T_{NIR}$ (%) | $a^*_r$ | $b^*_r$ | $a^*_t$ | $b^*_t$ | $R_s$ (Ω/sq) | SF | FOM | $l_4$ (nm) | $M_1=M_2$ (nm) | $l_1=l_3$ (nm) | $l_2$ (nm) | FWOT @ 550nm ($l_1+l_2+l_3$) | Max $\Delta C^*_r$ (0° to 60°) |
|---|---|---|---|---|---|---|---|---|---|---|---|---|---|---|---|---|---|
| 1 | 800 | 4.3 | 25.7 | 21.0 | -2.0 | 0.2 | -0.2 | 2.5 | 1.5 | 16.3 | 14.0 | 32.6 | 19.8 | 76.6 | 8.2 | 0.48 | 5.66 |
| 2 | 900 | 3.8 | 26.2 | 23.8 | -0.8 | 0.1 | -2.2 | 0.3 | 1.8 | 18.4 | 13.2 | 32.3 | 16.7 | 75.8 | 12.9 | 0.51 | 2.15 |
| 3 | 1000 | 3.6 | 26.4 | 27.5 | -0.5 | 0.0 | -2.5 | -1.1 | 2.1 | 19.4 | 13.1 | 31.0 | 14.3 | 69.3 | 20.3 | 0.53 | 1.07 |
| 4 | 1100 | 3.8 | 26.2 | 31.0 | -1.4 | 0.4 | -0.9 | -6.4 | 2.3 | 18.4 | 13.5 | 33.7 | 13.0 | 74.4 | 23.9 | 0.59 | 0.06 |
| 5 | 1200 | 6.0 | 24.0 | 46.1 | -4.6 | 0.2 | 2.3 | -7.0 | 3.2 | 11.7 | 14.4 | 41.1 | 9.3 | 80.0 | 25.7 | 0.63 | 0.07 |

FIG. 22

IR TRANSMITTING COATING FOR ELECTRO-OPTIC ELEMENT

TECHNOLOGICAL FIELD

The present invention generally relates to a mirror assembly, and more particularly, to a transflective mirror assembly with improved near infrared transmittance.

SUMMARY OF THE DISCLOSURE

According to one aspect of the present disclosure, an electro-optic assembly is disclosed. The assembly comprises a first substrate comprising a first surface and a second surface and a second substrate comprising a third surface and a fourth surface. The substrates form a cavity between the second surface and the third surface. The assembly further comprises an electro-optic medium disposed in the cavity, a transparent, electrically conductive layer disposed on the second surface, and a transflective element disposed on the third surface. The transflective element comprises a plurality of alternating layers comprising a metal layer stacked adjacent to an insulator layer. The transflective element is configured to reflect light in a visible spectrum and transmit light in a near infrared spectrum.

According to another aspect of the present disclosure, an electro-optic assembly is disclosed. The assembly comprises a first substrate comprising a first surface and a second surface and a second substrate comprising a third surface and a fourth surface. The first substrate and the second substrate form a cavity between the second surface and the third surface. The assembly further comprises an electro-optic medium disposed in the cavity. A first transparent, electrically conductive layer is disposed on the second surface. A transflective coating is disposed at the third surface, wherein the transflective coating comprises a multi-layer stack comprising alternating high-index (H) material and low-index (L) material and a conductive layer. The transflective element is configured to reflect light in a visible spectrum and transmit light in a near infrared spectrum.

According to yet another aspect of the present disclosure, an electro-optic device is disclosed. The device comprises a first substrate comprising a first surface and a second surface. The device further comprises a second substrate comprising a third surface and a fourth surface. The first substrate and the second substrate form a cavity between the second surface and the third surface. An electrochromic medium is disposed in the cavity. A transflective coating is disposed at the third surface, wherein the transflective coating comprises a multi-layer stack comprising alternating high-index (H) material and low-index (L) material.

These and other features, advantages, and objects of the present invention will be further understood and appreciated by those skilled in the art by reference to the following specification, claims, and appended drawings.

BRIEF DESCRIPTION OF THE DRAWINGS

In the drawings:

FIG. 13 is a table demonstrating optical and sheet resistance parameters for electro-optic assemblies;

FIG. 19 is a table demonstrating optical and sheet resistance parameters for an electro-optic assembly;

FIG. 20 is a table demonstrating optical and sheet resistance parameters for an electro-optic assembly;

FIG. 22 is a table demonstrating optical and sheet resistance parameters for an electro-optic assembly;

DETAILED DESCRIPTION

Figure 1:
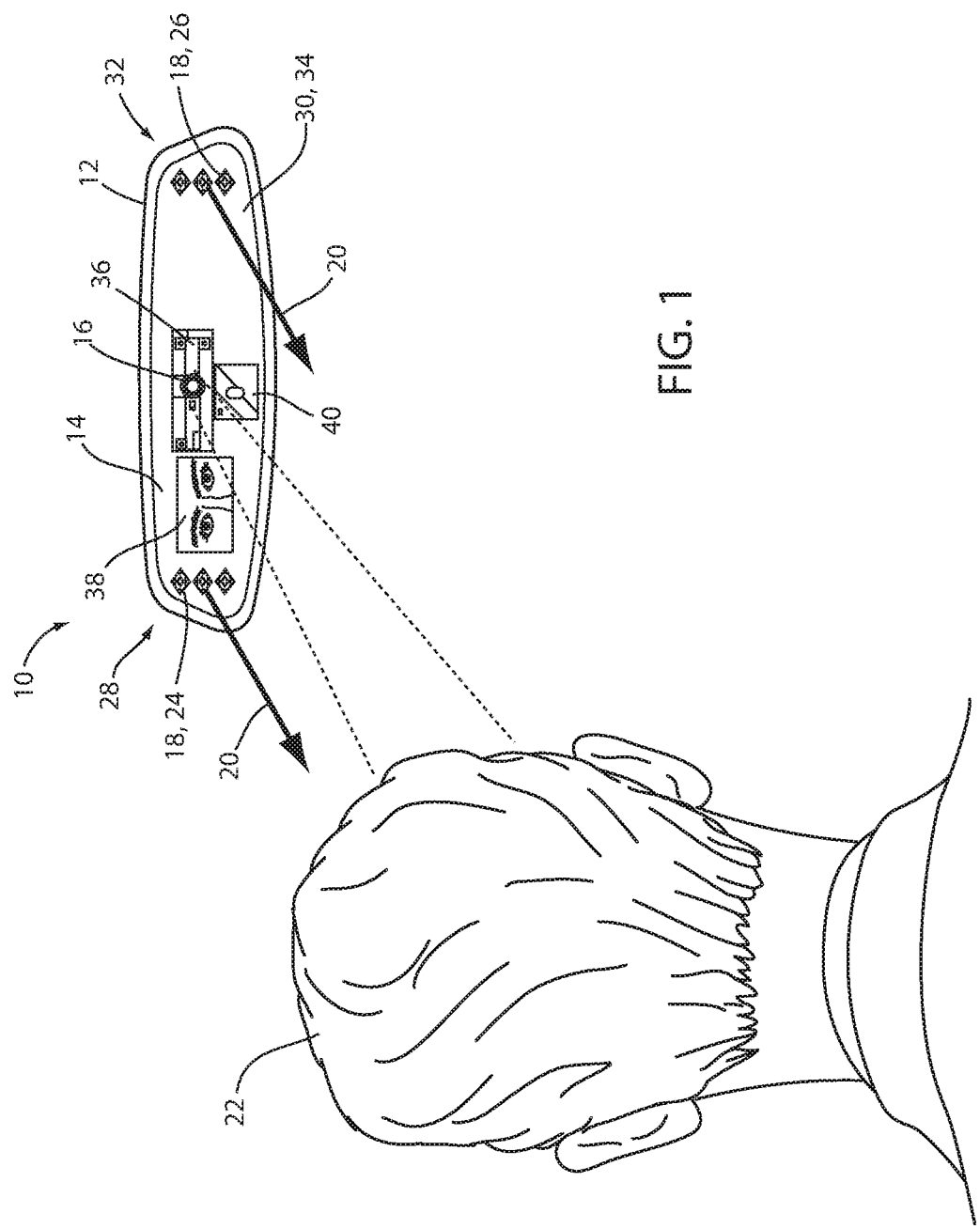
FIG. 1 is a projected view of an electro-optic assembly incorporated in an interior rearview mirror assembly.

For purposes of description herein, the terms "upper," "lower," "right," "left," "rear," "front," "vertical," "horizontal," and derivatives thereof shall relate to the invention as oriented in FIG. 1. Unless stated otherwise, the term "front"

shall refer to the surface of the element closer to an intended viewer of the mirror element, and the term "rear" shall refer to the surface of the element further from the intended viewer of the mirror element. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

Referring to FIG. 1, the disclosure may provide for a scanning apparatus 10 operable to perform an identification function. In an exemplary embodiment, the scanning apparatus 10 may be incorporated in a rearview mirror assembly 12 comprising an electro-optic assembly 14 for an automotive vehicle. The electro-optic assembly 14 may contain various forms of transflective mirror devices and in some embodiments, may comprise an electrochromic (EC) mirror. In this configuration, the mirror element 34 of the electro-optic assembly 14 may be an electrochromic mirror element which can vary in reflectivity in response to a control signal from a controller. The control signal may change an electrical potential supplied to the electro-optic assembly 14 to control the reflectivity.

The scanning apparatus 10 may be configured to process and/or control an identification function. The identification function may comprise an eye-scan or retinal identification function. In this configuration, the scanning apparatus 10 may provide for the interior rearview mirror assembly 12 to be configured to identify an operator or passenger of a vehicle based on the eye-scan identification function. The identification function may be processed by the controller and/or communicated from the controller to one or more systems to provide for an identification information of the operator or passenger of the vehicle.

The eye-scan-identification function may utilize an infrared illumination of an iris of an eye for the identification. The illumination of the eye(s) may be optimized in conditions allowing for a high optical transmittance in the near infrared (NIR) range. Accordingly, the disclosure provides for an electrochromic (EC) stack of the electro-optic assembly that may have a high light transmittance in wavelengths ranging from about 800 nm to 1000 nm in the electromagnetic optical spectrum. Additionally, in some implementations, the electro-optic assembly may comprise a plurality of light sources configured to illuminate at least one iris of the operator of the vehicle.

To provide for the eye-scan-identification function, for example an iris or retinal scan, an image sensor 16 may be disposed proximate a rear surface of the electro-optic assembly. The image sensor 16 may correspond to, for example, a digital charge-coupled device (CCD) or complementary metal-oxide-semiconductor (CMOS) active pixel sensor, although not be limited to these exemplary devices. The image sensor 16 may be in communication with at least one light source 18, which may correspond to one or more infrared emitters configured to output an emission 20 of light in the NIR range. In this configuration, the image sensor 16 may be configured to selectively activate the one or more infrared emitters corresponding to the at least one light source 18 to illuminate the iris such that an identity of an operator 22 of the vehicle may be determined.

The infrared emitters or the light sources 18 may correspond to a plurality of infrared emitter banks. Each of the infrared emitter banks may comprise a plurality of light emitting diodes, which may be grouped in a matrix or otherwise grouped and disposed behind a rear surface of the electro-optic assembly 14. In an exemplary embodiment, the plurality of light sources 18 may correspond to a first emitter bank 24 and a second emitter bank 26. The first emitter bank 24 may be configured to output the emission in the NIR range from a first side portion 28 of a front surface 30 of the electro-optic assembly 14. The second emitter bank 26 may be configured to output the emission in the NIR range from a second side portion 32 of the front surface 30 of the electro-optic assembly 14, which may comprise a mirror element 34 of the mirror assembly 12. In this configuration, the scanning apparatus 10 may be configured to illuminate the eyes of the operator 22 such that the image sensor 16 may capture an image of the irises of the eyes.

In an exemplary embodiment, each of the first emitter bank 24 and/or the second emitter bank 26 may correspond to more or fewer LEDs or banks of LEDs. In some embodiments comprising an electro-optic assembly having a high level of transmittance in the NIR range, the scanning apparatus 10 may utilize fewer or less intense LEDs. Electro-optic assemblies having a high level of transmittance in the NIR range may correspond to assemblies comprising a transflective coating disposed on a fourth surface of the electro-optic assembly.

Figure 4:
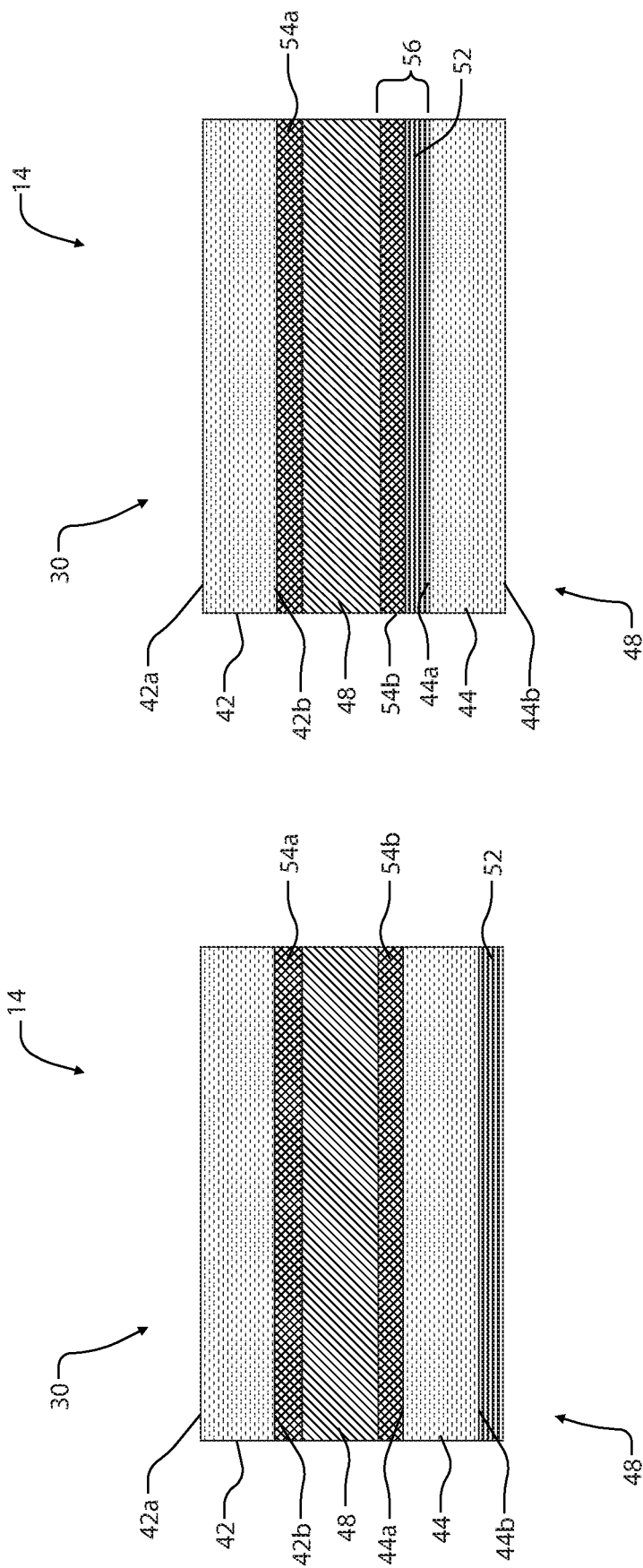
FIG. 4A is a side cross-sectional view of an electro-optic assembly with a transflective coating disposed on a fourth surface.
FIG. 4B is a side cross-sectional view of an electro-optic assembly with a transflective coating disposed on a third surface.

In some embodiments comprising an electro-optic assembly having a lower level of transmittance in the NIR range, the scanning apparatus 10 may utilize a greater number of or more intense LEDs. Electro-optic assemblies having a lower level of transmittance in the NIR range may correspond to assemblies comprising a metal-based, transflective coating disposed on a third surface of the electro-optic assembly. Further details of the electro-optic assembly are discussed in reference to FIGS. 2 and 4.

The image sensor 16 may be disposed on a circuit 36, for example a printed circuit board in communication with a controller. The controller may further be in communication with various devices that may be incorporated in the vehicle via the communication bus or any other suitable communication interface. The controller may correspond to one of more processors or circuits, which may be configured to process image data received from the image sensor 16. In this configuration, the image data may be communicated from the image sensor 16 to the controller. The controller may process the image data with one or more algorithms configured to determine an identity of the operator of the vehicle.

The controller may further be in communication with a display 38. The display 38 may be disposed in the mirror assembly 12 behind the rear surface. The controller may be operable to display the image data received from the image sensor 16 such that the operator 22 may view the image data. In this configuration, the operator 22 may adjust a position of the eyes shown on the display 38 to position the eyes such that the image data may include the necessary features required to identify the operator. In an exemplary embodiment, the features required to identify the operator of the vehicle may correspond to features of the eyes of the operator 22 (e.g., the irises).

The display 38 may correspond to a partial or full display mirror configured to display an image data through at least a portion of the mirror assembly 12. The display 38 may be constructed utilizing various technologies, for example LCD, LED, OLED, plasma, or other display technology. Examples of display assemblies that may be utilized with the disclosure may include U.S. Pat. No. 6,572,233 entitled "Rearview display mirror," U.S. Pat. No. 8,237,909 entitled "Vehicular Rearview Mirror Assembly Including Integrated Backlighting for a Liquid Crystal Display (LCD)," U.S. Pat. No. 8,411,245 entitled "Multi-Display Mirror System and Method for Expanded View Around a Vehicle," and U.S. Pat. No. 8,339,526 entitled "Vehicle Rearview Mirror Assembly Including a High Intensity Display," which are incorporated herein by reference in their entirety.

The scanning apparatus 10 may further comprise an indicator 40 in the mirror assembly 12. The indicator 40 may be in communication with the controller and configured to output a signal to identify a state of the scanning apparatus 10 and/or a rearview camera. The indicator 40 may correspond to a light source that may be operable to flash and/or change colors to communicate a state of the scanning apparatus 10. The indicator 40 may correspond to a light emitting diode (LED), and, in an exemplary embodiment, the indicator 40 may correspond to a red, green, and blue (RGB) LED operable to identify the state of the scanning apparatus 10 by outputting one of more colored emissions of light.

Figure 2:
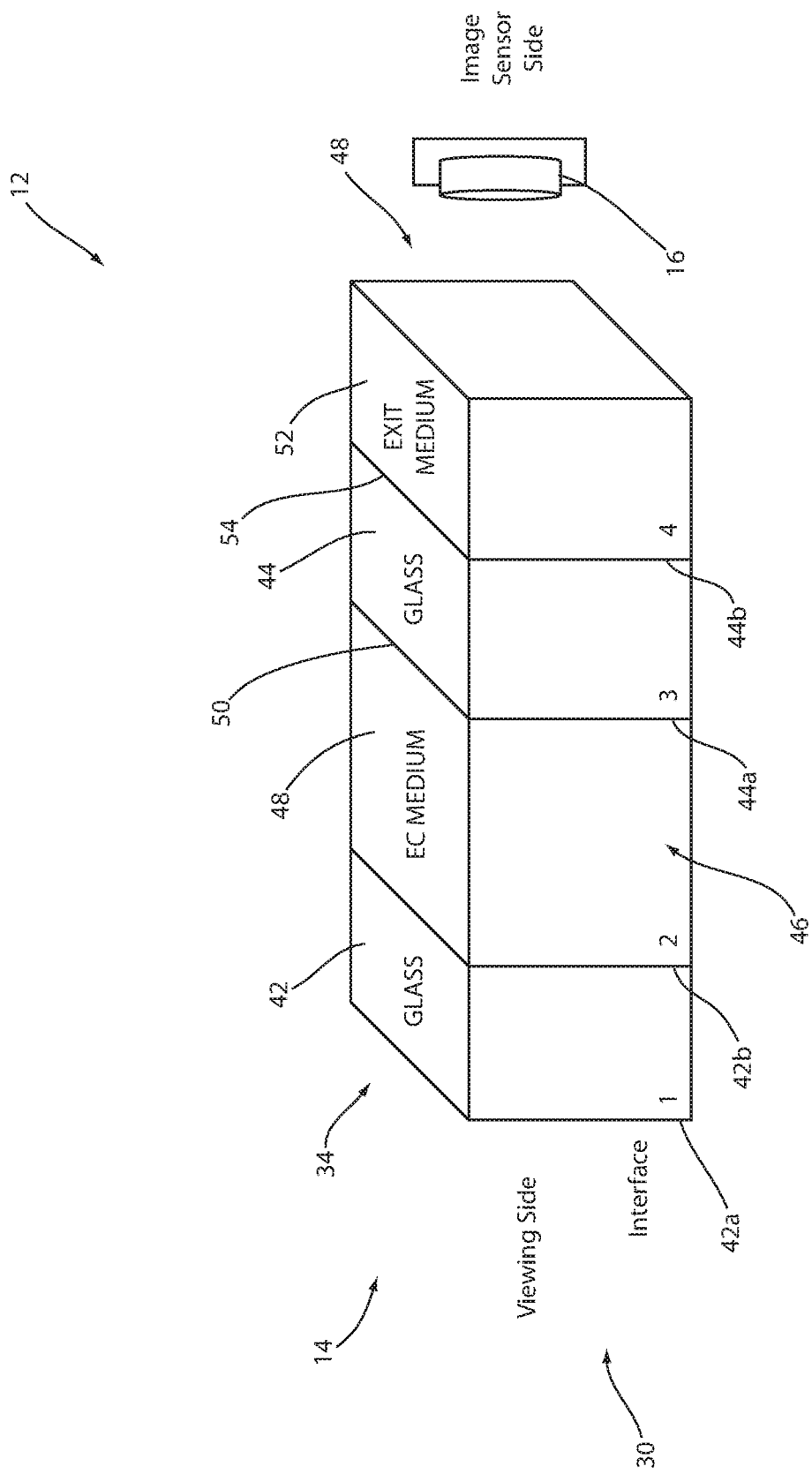
FIG. 2 is a cross-section view of a transflective mirror assembly.

Referring to FIG. 2, a cross-sectional view of a mirror assembly 12 is shown. The electro-optic assembly 14 may be partially reflective and partially transmissive and comprise the mirror element 34. The mirror element 34 may include a first substrate 42 having a first surface 42a and a second surface 42b. The mirror element 34 may further comprise a second substrate 44 having a third surface 44a and a fourth surface 44b. The first substrate 42 and the second substrate 44 may define a cavity 46 and may be substantially parallel. The first surface 42a and the third surface 44a may be oriented toward the front surface 30 of the mirror assembly 12. The second surface 42b and the fourth surface 44b may be oriented toward a rear surface of the mirror assembly 12.

The cavity 46 may contain an electro-optic medium 48, such as, but not limited to, an electrochromic medium. The cavity 46 may be completely or partially filled with the medium 48. The mirror assembly 12 may be in communication with a dimming controller via electrical contacts and may comprise various seals to retain the medium 48 in the cavity 46. In this configuration, the mirror assembly 12 may be configured to vary in reflectance in response to a control signal received from the dimming controller via the electrical contacts.

Figure 3:
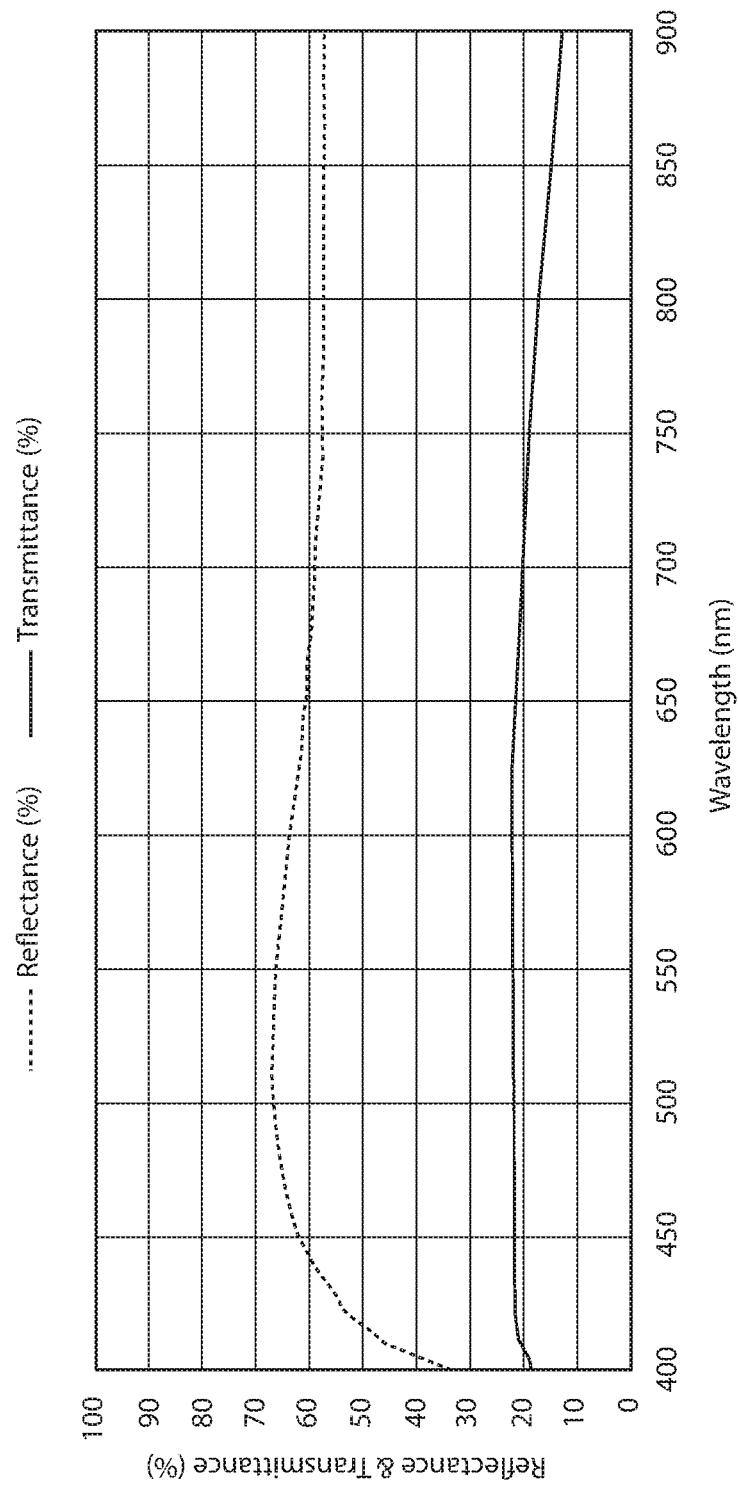
FIG. 3 is a graph illustrating the reflectance and transmittance spectra of a conventional electro-chromic (EC) mirror.

Each of the surfaces 42a, 42b, 44a, and 44b correspond to interfaces of the mirror assembly 12. The first surface 42a corresponds to a first interface 1. The second surface 42b corresponds to a second interface 2. The third surface 44a corresponds to a third interface 3, and the fourth surface 44b corresponds to a fourth interface 4. As shown, a transflective coating 50 may be disposed on the third interface 3. The transflective coating 50 may comprise a layer containing silver along with additional layers, such as metal, dielectric, and/or transparent conducting oxides located above or below the silver comprising layer or both. As shown in Table 1, the electrochromic element with a transflective coating 50 may have a nominal reflectance of 65% and a nominal transmittance of 22% in the visible range. The visible reflectance and transmittance may vary depending on design considerations and design objectives. However, in the NIR range, the transmittance will typically be less than the transmittance in the visible spectrum and may be less than 20%, as illustrated in FIG. 3. The relatively low transmittance in the NIR range may be due to the thickness and optical constants of materials comprising the metal-based, transflective coating.

TABLE 1

Visible optical properties of a transflective mirror with a metal-based, transflective coating 50.

| | Reflectance | Transmittance | Sheet Resistance | NIR Trans. | SF | FOM |
|---|---|---|---|---|---|---|
| Y | 65.00 | 21.86 | ~3 ohms/sq | 12% | 3.0 | 4.0 |
| L* | 84.48 | 53.88 | | | | |
| a* | −4.35 | −0.31 | | | | |
| b* | 3.65 | 0.82 | | | | |

The stealth factor, defined here as the ratio of the visible reflectance over the transmission (SF=Yr/Yt), is a measure of the perceived contrast of the objects behind the assembly and from the reflected light, therefore, a high SF is desirable to hide or camouflage components like NIR cameras or light sources or any other component behind an electro-optic assembly and prevent use of, or minimize the requirements of, an opacifier or appliqués. The figure of merit (FOM), as described by the Equation 1, is a useful metric to compare electrodes where a high $T_{NIR}$ value is desired. The FOM may be valuable because it equally weighs near IR transmittance and sheet resistance ($R_s$), which can be used to find the most efficient structure for a certain condition, for example, for a given visible reflectance level.

$$FOM = \frac{T_{NIR}}{R_s} \quad (1)$$

The metal-based, transflective coating 50 may inhibit the light source 18 and reduce the intensity of the energy of the light source 18 reaching the subject if the light source is configured in the mirror assembly 12 rearward of, and transmitting through, the electrochromic element. Additionally, the metal-based, transflective coating 50 may inhibit a returning signal to be captured by a receiver of the image sensor 16 if it is also configured to be rearward of the transflective electrochromic element. Maintaining a neutral color in the reflected and transmitted spectrums of the image sensor 16 requires precise engineering of the coating materials and thicknesses on each of the interfaces 1-4. Such precision prevents color bias of the mirror and devices, such as the image sensor 16, configured rearward of the electrochromic element.

Referring now to FIGS. 4A and 4B, exemplary embodiments of electro-optic assemblies 14 are illustrated demonstrating one or more coatings applied to the fourth surface 44b and the third surface 44a, respectively. As demonstrated in FIGS. 4A and 4B, the disclosure may provide for the electro-optic assemblies to be configured in a variety of ways. For example, in some embodiments, a transflective coating 52 may be applied to the fourth surface 44b to provide a suitable visible reflectance for the mirror assembly 12 while maintaining an enhanced near infrared (NIR)

transmittance. However, while the transflective coating 52 on the fourth surface 44b may be well suited to providing reflectance of visible light and significant transmittance of NIR light, the transflective coating 52 may not be suited for application on the third surface 44a due to a limited electrical conductivity.

For example, in some embodiments, the transflective coating 52 may comprise low-loss dielectric materials configured in an alternating high and low refractive index multi-layer stack. Examples of low-loss dielectric materials include, but are not limited to, niobium oxide, silicon oxide, tantalum oxide, aluminum oxide, etc. In an exemplary embodiment, the high refractive index (H) material may be Niobium Oxide and the low refractive index (L) material may be Silicon Dioxide. The material properties of the transflective coating 52 may provide for a number of beneficial applications, but may not provide for the electrical conductivity required to supply a voltage potential to the electro-optic medium 48. Accordingly, the transflective coating 52 may be applied to the fourth surface 44b, but may not be well-suited for incorporation on the third surface 44a because it may not conduct electrical charge across the electro-optic medium 48.

As shown in FIG. 4A, the inability of the transflective coating 52 to function as an electrode thus requires a separate, second transparent conductive layer 54b to be applied to the third surface 44a. That is, the embodiment shown in FIG. 4A requires a first transparent conductive layer 54a on the second surface 42b, the second transparent conductive layer 54b on the third surface 44a, and the transflective coating 52 on the fourth surface 44b. However, there are certain applications that the transflective coating 52 on the on the fourth surface 44b may not be ideal. For example, such a coating could cause an increase in cost due to manufacturing and processing the transflective coating 52. Further, spacing between the second surface 42b and the transflective coating 52 on the fourth surface 44b may result in unwanted shadows in some applications. For these reasons, it may be desirable to remove the transflective coating 52 from the fourth surface 44b.

Referring now to FIG. 4B, an embodiment of the electro-optic assembly 14 is shown demonstrating a electrically conductive transflective layer 56 disposed on the third surface 44a. In this configuration, the electrically conductive transflective layer 56 may be configured to perform a dual use as an electrode and a mirror. The novel designs taught herein are enabled by including layers in the integrated design that conduct electricity which, in some embodiments may include layer 54b. Additional layers, which for illustrative purposes are separated out in layer 56, may function to either enhance optical effects or electrical conductivity, or both. Depending on the particular performance needs of the electro-optic assembly 14, the sheet resistance requirements of the electrically conductive transflective layer 56 will vary. For example, the electro-optic assembly 14 may comprise a liquid crystal base and correspond to a field-effect device. In this configuration, the field-effect device may operate with high sheet resistance values (50-500 ohms/sq). In contrast, if the electro-optic assembly 14 is a current based device, lower sheet resistance (<50 ohms/sq) values may be preferred. In particular, the uniformity and speed of the electro-optic medium 48 comprising fluid or gel based electrochromic materials in the 48 devices benefit from particularly low sheet resistance values (<15 ohms/sq). For example, U.S. Pat. Nos. 9,529,214 and 9,056,584 disclose electrochromic element systems that benefit from low sheet resistance on the second surface 42b and the third surface 44a.

Some materials that may be utilized for the transparent conductive layers 54 forming the electrodes may include transparent conducting oxides (TCOs), such as indium tin oxide (ITO) and metals. Other TCO's include doped-zinc oxide, fluorine or antimony doped tin oxide, indium zinc oxide, or the like. The limitation of these materials is that the TCOs have low reflectivity. In contrast, metals have good reflectivity but low NIR transmittance. Therefore, neither material alone provides a solution to achieve the conductive transflective layer 56 on the third surface 44a with a high level of reflectivity and high transmittance in the NIR range. For example, a silver based coating may have a limited NIR transmittance in the wavelength range between 800 nm and 1000 nm. The NIR transmittance may be 22% for a visible reflectance value of 55%, 17% for a visible reflectance value of 60%, and 12% for a visible reflectance value of 65%. Such performance characteristics may not be adequate for applications comprising the light sources (e.g., the light sources 18) configured to output the emission 20 in the NIR range through the electro-optic assembly 14. Accordingly, the disclosure provides for a variety of embodiments that may incorporate the electrically conductive transflective layer 56 on the third surface 44a with sufficient electrically conductivity, reflectance, and transmission in the NIR range such that the transflective coating 52 may be omitted from the fourth surface 44b.

Figure 5:
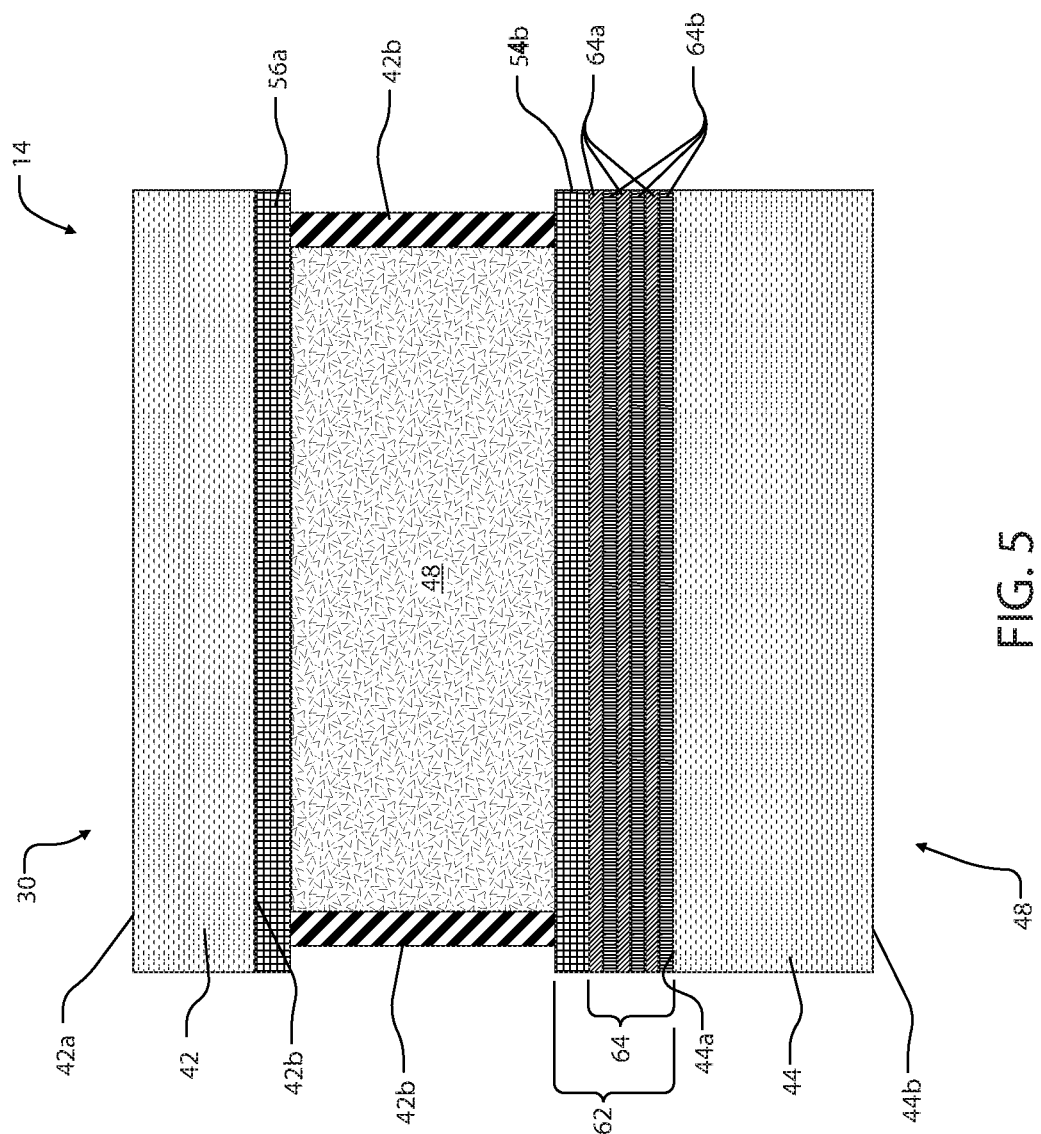
FIG. 5 is a side cross-sectional view of an exemplary embodiment of an electro-optic assembly with a transflective coating disposed on a third surface.

Referring now to FIG. 5, an exemplary embodiment of the electro-optic assembly 14 comprising a conductive transflective element 62 is shown. The conductive transflective element 62 may be similar to the conductive transflective layer 56 and, accordingly, may comprise the transflective coating 52. The element 62 is disposed between the electro-optic medium 48 and the third surface 44a of the electro-optic assembly 14. In this configuration, the transflective coating 52 may be omitted from the fourth surface 44b. The specific configuration and number of layers of the conductive transflective element 62 may vary based on desired performance characteristics for the electro-optic assembly 14. In this way, the disclosure provides for a variety of exemplary configurations of the electro-optic device 14 comprising the conductive transflective element 62.

The transflective element 62 may correspond to a coating configured to function as both an electrode (e.g., the second transparent conductive layer 54b) and a mirror (e.g., the transflective coating 64). In order for the element 62 to provide such function, the element 62 may comprise one or more electrically conductive layers. However, the materials that may add the conductive properties to the transflective element 62 may reduce the NIR transmittance. Therefore, a variety of common materials are not well suited to form the transflective element 62. The disclosure provides for a number of materials and combinations that may be utilized to achieve the desired results including an electrically conductive layer with a high level of visible reflectance and NIR transmittance such that the emission 20 of light in the NIR range can pass through the transflective element 62.

Referring to FIG. 5, in some embodiments, the electro-optic assembly 14 may comprise the first transparent conductive layer 54a on the second surface 42b and the second transparent conductive layer 54b disposed between the electro-chromic medium 48 and a layered transflective coating 64 of the transflective element 62. The second transparent conductive layer 54b may form a conductive coating configured to communicate a voltage potential over the electro-optic medium 48. The second transparent conductive layer 54b may have a thickness of 148 nm and a sheet resistance of about 9 to 15 ohms/square on the second and third surfaces of the assembly using glass as the substrates.

The conductive layers (e.g. 54a and 54b), in some embodiments, is shown as a separate layer for illustrative purposes. It is understood that in transflective designs, the addition of arbitrary layers may have significant implications on the net optical properties, e.g., reflectance and transmittance spectra, color and angle stability of these properties. The conductive layer, though shown as a separate layer, is part of an overall stack whose materials and layer thicknesses are optimized to achieve design goals. For example, in an automotive application, the electro-optic mirror will need to have neutral reflected color as quantified by a* and b* being between about −5 and 5 units or alternatively quantified by having a C* less than 15, 10 or 5 units. Furthermore, in some embodiments, the color should be stable at angle up to 30 degrees wherein the delta C* with angle is less than 15, less than 10 or less than 5. In some embodiments, the electro-optic assembly 14 may have color stability up to 45 degrees or even up to 60 degrees.

Adjacent the second transparent conductive layer 54b, the transflective coating 64 of the conductive transflective element 62 may comprise alternating layers of high (H) index material 64a and low (L) index material 64b. The number of layers in the instant embodiment of the conductive transflective element 62 may include seven layers comprising six layers of the transflective coating 64 and the second conductive layer 54b. The layers of the transflective coating 64 may comprise three layers of low (L) index material 64a and three layers of high (H) index material 64b. The configuration of the layers of the conductive transflective element 62 is detailed in Table 2.

TABLE 2

Six-layer transflective coating design with the
second transparent conductive layer 54b in ITO

| Front Layer No. | Electro-Optic Medium 48 7-Layer Design | |
|---|---|---|
| 1 | ITO | 148 nm |
| 2 | L-Index | 157 nm |
| 3 | H-Index | 56 nm |
| 4 | L-Index | 90 nm |
| 5 | H-Index | 53 nm |
| 6 | L-Index | 88 nm |
| 7 | H-Index | 109 nm |
| Back | Second Substrate 44 | |

The high (H) index material 64b may comprise Niobium pentoxide $Nb_2O_5$ and the low (L) index material 64a may comprise silicon dioxide $SiO_2$. In this configuration, the optical performance was calculated as listed in Table 3.

TABLE 3

Optical performance for six-layer transflective coating
64 with second transparent conductive layer 54b in ITO

| | Visible | | | NIR | Sheet | | |
|---|---|---|---|---|---|---|---|
| | Reflectance | Transmittance | Absorption | Transmittance | Resistance | SF | FOM |
| Y | 53.9 | 38.9 | 7.2 | 79.1 | 12 | 1.4 | 6.6 |
| L* | 78.4 | 68.7 | | | | | |
| a* | −3.4 | −0.65 | | | | | |
| b* | 2.7 | −0.2 | | | | | |

Figure 7:
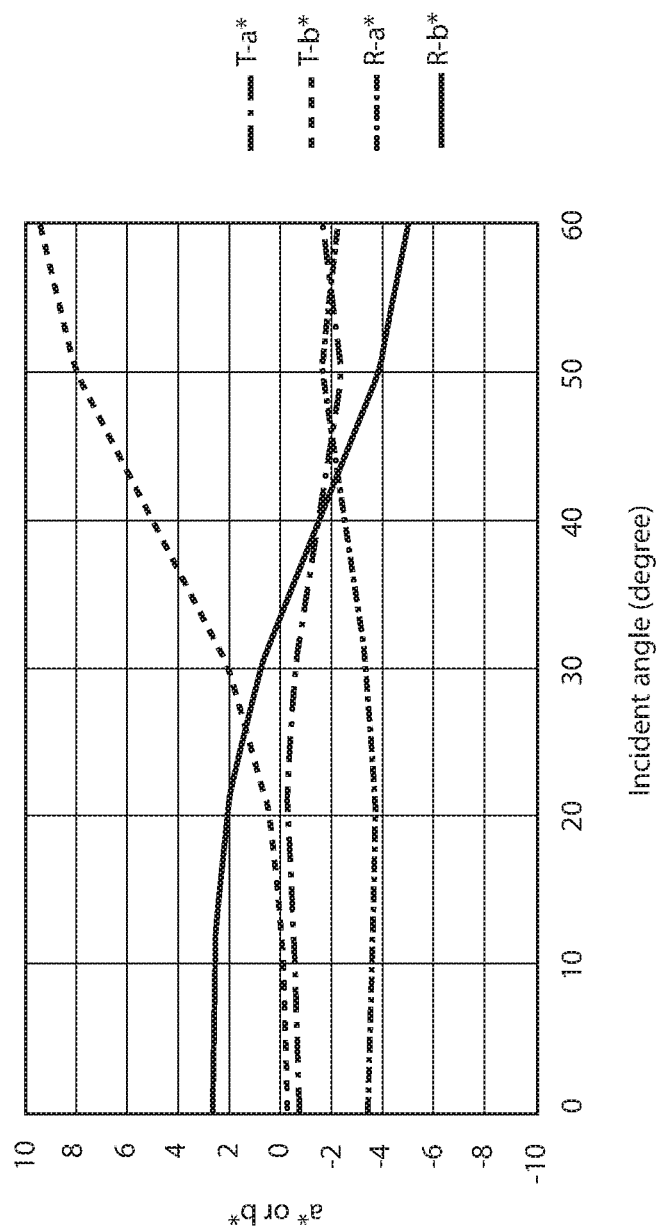
FIG. 7 is plot demonstrating performance characteristics for a transflective coating comprising six-layers.

Based on the results described in Table 3, the electro-optic assembly 14 may be configured to only absorb 7.2% of the total energy received. The transmission and reflection of visible light are optimized at 38.9% and 53.9%, respectively. Additionally, the NIR transmission of the electro-optic assembly 14 comprising the transflective coating 64 comprising six-layers is 79.1% for 810 nm region of the optical spectrum. Accordingly, the transflective coating comprising six-layers demonstrates a good color neutral appearance for both transmission and reflection spectra, as demonstrated in FIG. 7. As illustrated in FIG. 7, the CIE a* and b* both are between −5 to 5 from 0 to 40 degree viewing angles.

Referring again to FIG. 5, in another embodiment, the conductive transflective element 62 may comprise the transflective coating 64 comprising twelve alternating layers of the H-index material and the L-index material. The layers of the transflective coating 64 may comprise six layers of high (H) index material 64b (e.g., Niobium pentoxide $Nb_2O_5$) and six layers of low (L) index material 64a (e.g., silicon dioxide $SiO_2$). The configuration of the layers of the conductive transflective element 62 is detailed in Table 4. The twelve alternating layers of the transflective coating 64 may be disposed between the second transparent conductive layer 54b and the third surface 44a. Similar to the previously discussed embodiment, the second transparent conductive layer 54b may form a conductive coating configured to communicate a voltage potential over the electro-optic medium 48. The second transparent conductive layer 54b may have a thickness of 148 nm and a sheet resistance of about 9 to 15 ohms/square on the second and third surfaces of the assembly using glass as the substrates.

TABLE 4

Twelve-layer transflective coating design with the
second transparent conductive layer 54b in ITO

| Front Layer No. | Electro-Optic Medium 48 13-layer Design | |
|---|---|---|
| 1 | ITO | 148.0 nm |
| 2 | L | 157.0 nm |
| 3 | H | 13.9 nm |
| 4 | L | 116.5 nm |
| 5 | H | 26.3 nm |
| 6 | L | 77.0 nm |
| 7 | H | 31.0 nm |
| 8 | L | 106.0 nm |
| 9 | H | 72.4 nm |
| 10 | L | 146.6 nm |
| 11 | H | 21.9 nm |
| 12 | L | 112.0 nm |
| 13 | H | 88.8 nm |
| Substrate | Second Substrate 44 | |

In this configuration, the optical performance was calculated as listed in Table 5.

TABLE 5

Optical performance for twelve-layer transflective coating 64 with second transparent conductive layer 54b in ITO

| | Visible | | | NIR | Sheet | | |
|---|---|---|---|---|---|---|---|
| | Reflectance | Transmittance | Absorption | Transmittance | Res. | SF | FOM |
| Y | 55.4 | 36.0 | 8.6 | 79.6 | 12 | 1.5 | 6.6 |
| L* | 79.3 | 66.6 | | | | | |
| a* | −0.96 | −2.57 | | | | | |
| b* | −0.55 | 1.48 | | | | | |

Figure 8:
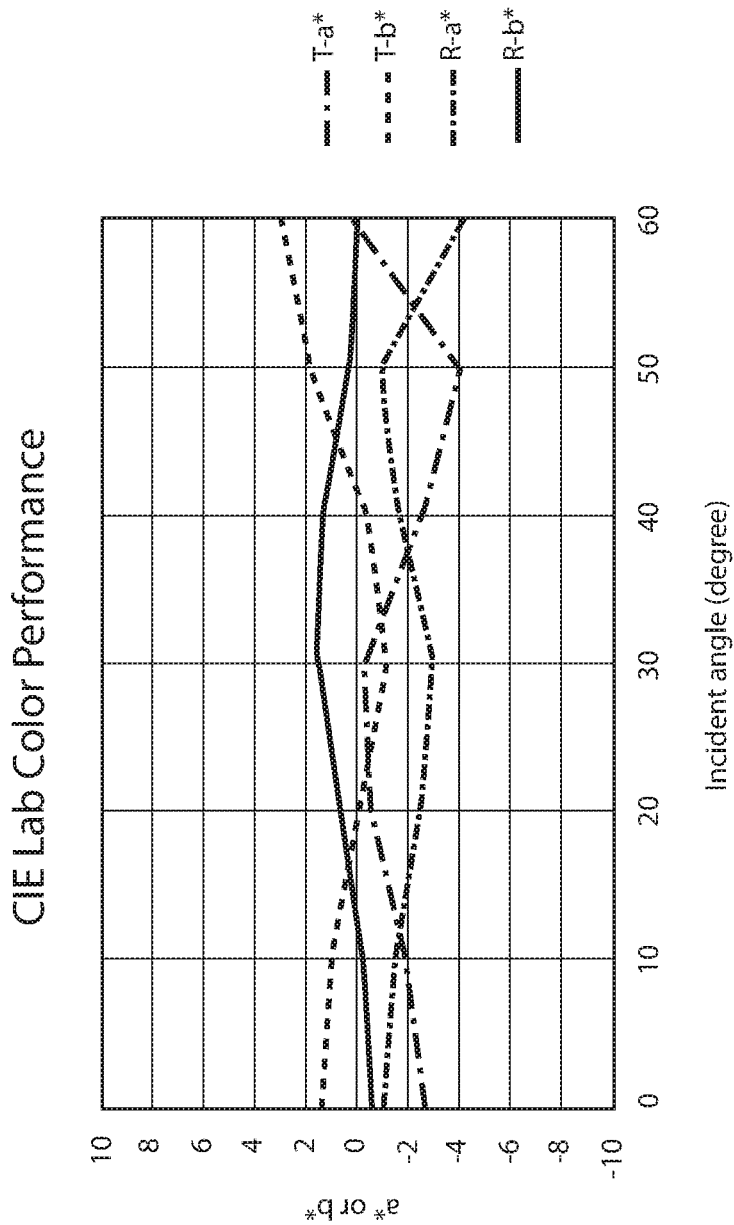
FIG. 8 is plot demonstrating performance characteristics for a transflective coating comprising greater than six-layers.

As described in Table 5, the total energy absorption of the electro-optic device 14 was 8.5%. The transmission and reflection of visible light were optimized at 36.0% and 55.4%, respectively. The NIR transmission was 79.6% for 810 nm region of the optical spectrum. Additionally, with more layers, the performance of the transflective coating 64 may improve to have a better color neutral appearance for both transmission and reflection spectra as the CIE a* and b* both are between −5 to 5 from 0 to 60 degree viewing angles as shown in FIG. 8.

In various embodiments, the conductive transflective element 62 may comprise at least one or a plurality of dielectric layers forming the transflective coating 64. As discussed previously, the transflective coating 64 may comprise as little as two layers and, in some cases, may comprise a large number of layers. For example, the transflective coating 64 may comprise 27 layers of alternating layers of the H-index material and the L-index material. The layers of the transflective coating 64 may comprise alternating layers of high (H) index material 64b (e.g., Niobium pentoxide $Nb_2O_5$) and layers of low (L) index material 64a (e.g., silicon dioxide $SiO_2$). The 27 alternating layers of the transflective coating 64 may be disposed between the second transparent conductive layer 54b and the third surface 44a. Additionally, the second transparent conductive layer 54b may be applied between the transflective coating 64 and the electro-optic medium 48.

TABLE 6

Twenty-seven-layer transflective coating design with the second transparent conductive layer 54b in ITO

| Front Layer No. | Electro-Optic Medium 48 28-layer Design | |
|---|---|---|
| 1 | ITO | 148.0 nm |
| 2 | H | 25.9 nm |
| 3 | L | 14.8 nm |
| 4 | H | 89.9 nm |
| 5 | L | 126.8 nm |
| 6 | H | 19.7 nm |
| 7 | L | 160.4 nm |
| 8 | H | 98.1 nm |
| 9 | L | 132.9 nm |
| 10 | H | 24.5 nm |
| 11 | L | 54.4 nm |
| 12 | H | 97.4 nm |
| 13 | L | 57.5 nm |
| 14 | H | 14.7 nm |
| 15 | L | 134.9 nm |
| 16 | H | 87.8 nm |
| 17 | L | 114.4 nm |
| 18 | H | 118.8 nm |
| 19 | L | 132.7 nm |
| 20 | H | 101.1 nm |
| 21 | L | 203.2 nm |
| 22 | H | 118.1 nm |
| 23 | L | 165.3 nm |
| 24 | H | 96.7 nm |
| 25 | L | 162.4 nm |
| 26 | H | 107.7 nm |
| 27 | L | 36.7 nm |
| 28 | H | 13.2 nm |
| Substrate | Second Substrate 44 | |

Figure 6:
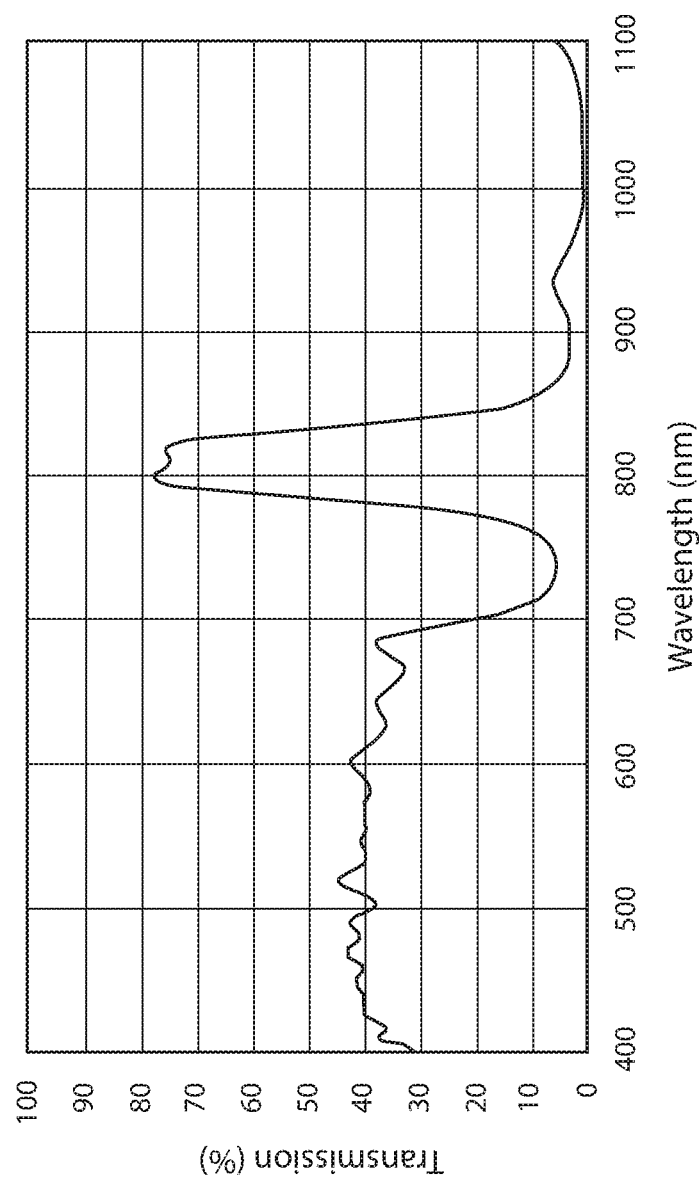
FIG. 6 is a plot demonstrating performance characteristics for a transflective coating comprising twenty-seven-layers.

The optical performance of the 27-layer configuration is demonstrated in Table 7. The reflection and transmission are 50.0% and 40.3%, respectively, for the visible light. The transmission in NIR at 810 nm is 74.7%. As seen in FIG. 6, the transmission from 713 to 763 nm and 855 to 1100 nm are below 10%, which eliminate the noise from the light source 18 and environment. In some embodiments, it may be desirable to have the transmittance in wavelengths adjacent to the narrow transmittance band have a transmittance less than about 15%, less than about 10% or even less than about 5%. The CIE LAB color coordinates a* and b* are also between −5 to 5 indicating good neutral color appearance.

TABLE 7

Optical performance for twenty-seven-layer transflective coating 64 with second transparent conductive layer 54b in ITO

| | Visible | | | NIR 810 nm |
|---|---|---|---|---|
| | Reflectance | Transmittance | Absorption | Transmittance |
| Y | 50.0 | 40.3 | 9.7 | 74.7 |
| L* | 76.1 | 69.7 | | |
| a* | −2.31 | −2.14 | | |
| b* | 1.62 | −0.23 | | |

In some embodiments, a combination of materials, including silicon, has been found to achieve the optical and conductive properties desired for the transflective element 62. Silicon is an example of a sub-class of materials known as semiconductors that have a relatively high refractive index and low band gap which translates into relatively high reflectance in the visible spectrum and high transmittance in the NIR. However, silicon and other semiconductors are not reflective enough to provide adequate visible reflectance to provide for a clear reflection from the mirror assembly 12 nor are they electrically conductive enough to function as electrodes. The reflectance of the silicon may be enhanced by several methods, such as by adding a flash metal layer and/or by the addition of pairs of layers with low and high refractive indices.

For example, the reflectance of a single layer of silicon may be about 63% as a single layer on the second substrate 44. The addition of a quarter wave of silicon dioxide ($SiO_2$)

and a quarter wave of ITO to the third surface 44a would increase the reflectance to about 72%, e.g., glass/silicon/SiO2/ITO/EC. In this configuration, the ITO may provide electrical conductivity while the silicon and silicon dioxide and ITO may form a transflective coating 64. Accordingly, the transflective element 62 may comprise a stack including Si/SiO2/ITO applied to the third surface 44a. The reflectivity in an electrochromic device would be 40% and 48%, respectively, for the Si layer alone and with the SiO2/ITO bi-layer. In this novel stack, the ITO would provide electrical conductivity while the entire stack of the transflective coating 64 could be tuned to meet the reflectance and transmittance goals of the assembly. In some embodiments, additional pairs of low and high refractive index layers 64a may be added to further increase the reflectance. The added reflectance may be necessary to achieve different performance requirements.

Though Silicon is discussed in reference to various exemplary embodiments, various other semiconductor materials may also be utilized to form the transflective element 62. Such semiconductor materials may include, but are not limited to, SiGe, InSb, InP, InGa, InAlAs, InAl, InGaAs, HgTe, Ge, GaSb, AlSb, GaAs and AlGaAs. Other semiconductor materials that would be viable would be those that have a band gap energy at or below about 3.5 eV. The thickness of the semiconductor layers may be between about 2.5 and 150 nm, or between about 5 and 100 nm or between about 10 and 30 nm. Additional examples, comprising a high refractive index semiconductor layer, are discussed in the following description.

Figure 9:
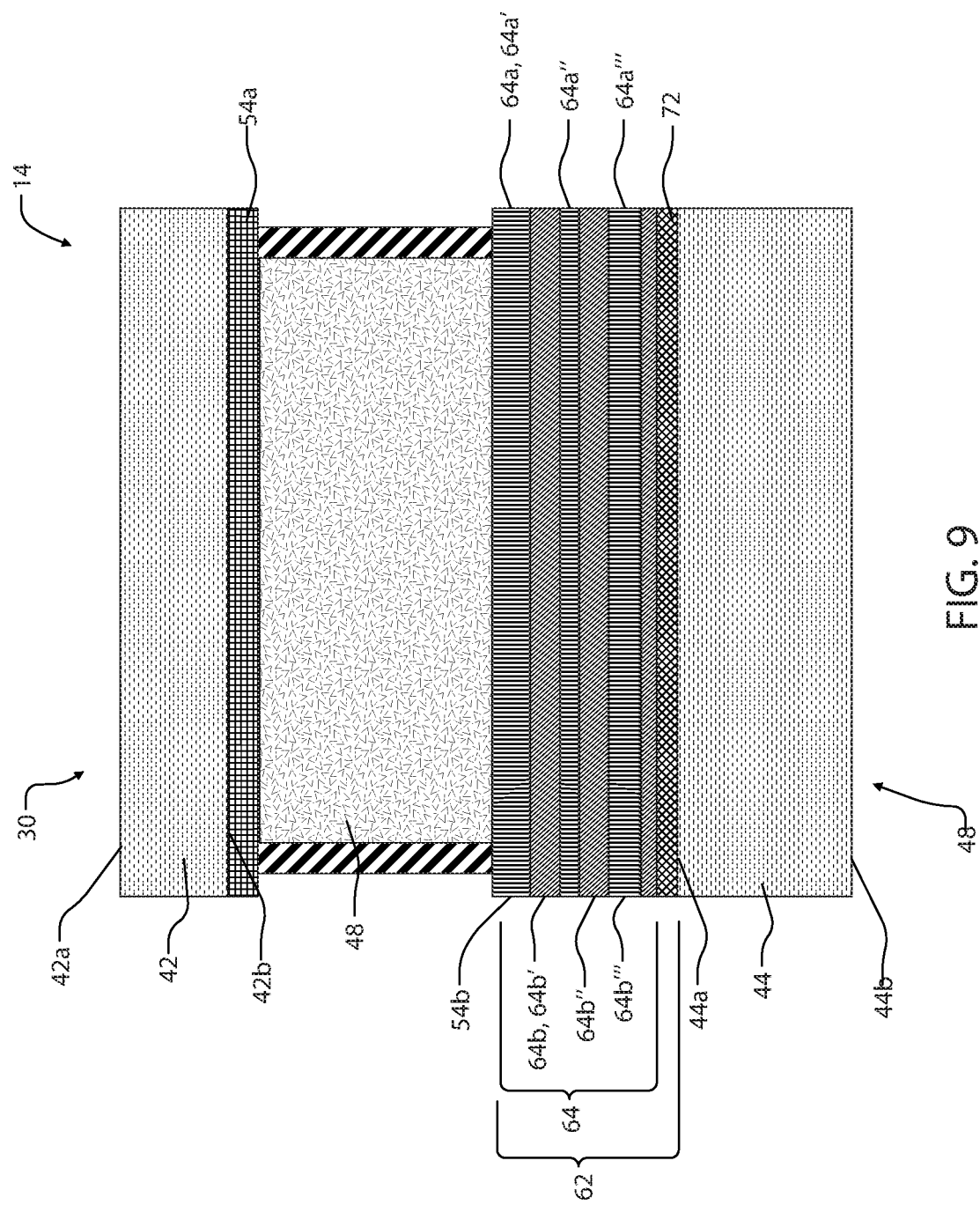
FIG. 9 is a side cross-sectional view of an exemplary embodiment of an electro-optic assembly with a transflective coating disposed on a third surface comprising a semiconductor layer.

Referring now to FIG. 9, another embodiment of the electro-optic device 14 is shown. As shown in FIG. 9, the transflective element 62 may comprise the transflective coating 64 comprising a semiconductor layer 72. The semiconductor layer 72 may be disposed between one or more layers of the high and low-index materials 64a and 64b and the second substrate 44. In the embodiment of FIG. 9, the high-index material 64a may correspond to ITO and the low-index material 64b may correspond to silicon dioxide. A first high-index layer 64a' may be adjacent the electro-optic medium 48 and function as the second transparent conductive layer 54b. A first low-index layer 64b' may be adjacent the first high-index layer 64a' and the semiconductor layer 72 may be adjacent the first low-index layer 64b'. Accordingly, transflective element may comprise at least one pair of high- and low-index layers 64a and 64b as well as the semiconductor layer 72. Additional pairs of the high- and low-index layers 64a (64a', 64a", 64a''', etc.) and 64b (64b', 64b", 64b''', etc.) may be added to further enhance the reflectance and/or provide design flexibility for increased NIR transmittance and/or color tuning. It is understood that additional pairs of layers may be added and are within the scope of the invention. Furthermore, additional individual layers may be added to enhance tunability of the coating attributes.

As illustrated in FIG. 9, the semiconductor layer 72 is shown adjacent to the third surface 44a. However, it shall be understood that the semiconductor layer 72 may be located at other locations within the multilayer stack of the transflective element 62 and may be arranged adjacent to the low-index material 64b. For example, in one embodiment, the semiconductor layer 72 may switch places with one the first high-index layer 64a', the second high-index layer 64a", and the third high-index layer 64a'''. In this way, the arrangement of the layers of the transflective element 62 may be adjusted to suit a variety of applications.

The low-index layers 64b may have a refractive index less than about 1.7, or less than about 1.6 or less then about 1.5.

Suitable materials for the low-index layers 64b may include alumina, silica, magnesium fluoride, or the like. The high-index layers 64a may have a refractive index greater than about 1.8, or greater than about 2.0 or greater than about 2.3. In some embodiments, at least one of the high-index layers 64a may comprise a TCO such as ITO. The sheet resistances of the transflective element 62 may decrease as more of the high-index layers 64a comprise a TCO. In some embodiments, each of the high-index layers 64a may comprise a TCO. It shall be understood that the high and low refractive index layers 64a and 64b may comprise the same material or different materials. It is understood that one could use one material as a low index or a high index in relation to the index of the adjacent materials, for example, one could use ITO with an index of approximately 1.9 as a high index if it is adjacent to $SiO_2$ with an approximate index of 1.5 but one could use it as a low index if adjacent to $TiO_2$ with an approximate refractive index of 2.4.

In some embodiments, the layer adjacent to the electro-optic medium 48 (e.g., high-index layer 64a') comprises an electrically conductive material, such as a TCO. The thickness of the individual low and high-index layers 64a and 64b may be between about 10 and 500 nm, or may be between about 20 and 240 nm, or between about 40 and 160 nm. The thickness of a TCO layer, when present, may be increased to help attain lower sheet resistance values for the transflective element 62. The sheet resistance of the transflective element 62 may be less than about 30 ohms/sq, or less than about 15 ohms per square or less than 10 ohms per square, or even less than 6 ohms/sq.

The transflective element 62 comprising the semiconductor layer 72 may resolve one or more issues related to the limited transmission in the NIR range for the mirror assembly 12 and provide NIR transmittance greater than about 20% while simultaneously providing electrical conductivity. The transflective element 62 may be designed to attain a reflectance level comparable to an industry standard, i.e., about 40% to 75%, or about 45% to 70%, or about 50% to 65%. Additionally, the transflective element 62 may be designed to attain a neutral color appearance in the visible color range for normal incidence viewing angle up to broad viewing angles. In this way, the disclosure provides for improved transmittance in the NIR range while maintaining visible color performance and mirror functionality for the mirror assembly 12. The transflective element 62 may provide for a transmittance in the NIR range greater than 30% in some embodiments. In some embodiments, the NIR transmittance of the transflective element 62 may be greater than 50%. In other embodiments, the NIR transmittance, for at least some wavelengths between about 800 and 940 nm, may be greater than the visible transmittance, greater than 1.5 times the visible transmittance, or greater than 2 times the visible transmittance.

Still referring to FIG. 9, thin film models were used to calculate the performance metrics for a semiconductor comprising the transflective coating 64 in the following examples. In a first example, the transflective element 62 comprises the semiconductor layer 72 as silicon and two pairs of the high and low-index layers 64a and 64b. The high-index layers 64a' and 64a" are of ITO and the low-index layers 64b' and 64b" are of silicon dioxide $SiO_2$. The results from the calculations are shown in Table 8 for the transflective element described in Table 7. The layer thicknesses were optimized to attain a visible reflectance of 55% and reasonable reflected color. The sheet resistance is estimated based on the thickness of the ITO layers in the stack of the transflective element 62 assuming a bulk resistivity of 160 micro-ohm cm. The NIR transmittance in the 800-1000 nm range is approximately 40%.

TABLE 7

Thickness of exemplary transflective element comprising the semiconductor layer 72

| Front Layer No. | Electro-Optic Medium 48 5-layer Design | | |
|---|---|---|---|
| 1 | H-Index 64a' | ITO | 164.5 |
| 2 | L-Index 64b' | SiO2 | 44.1 |
| 3 | H-Index 64a" | ITO | 59.4 |
| 4 | L-Index 64b" | SiO2 | 127.3 |
| 5 | Semiconductor 72 | Si | 22.0 |
| Substrate | | Second Substrate 44 | |

In this configuration, the optical performance was calculated as listed in Table 8.

TABLE 8

Optical performance for transflective element 62 comprising the semiconductor layer 72 shown in Table 7

| | Visible | | | NIR | Sheet | | |
|---|---|---|---|---|---|---|---|
| | Reflectance | Transmittance | Absorption | Transmittance | Resistance | SF | FOM |
| Y | 55 | 17 | 28 | 40 | 7.1 | 3.2 | 5.6 |
| L* | 79.0 | 48.3 | | | | | |
| a* | −2.5 | 1.8 | | | | | |
| b* | 4.5 | 16.1 | | | | | |

In another example, the thicknesses of the layers of the transflective element 62 were optimized to attain a visible reflectance of 55% and reasonable reflected color. Additionally, the semiconductor layer 72 located between pairs of the high- and low-index layers 64a and 64b. The semiconductor 72 is of silicon. The low-index layers 64b' and 64b" are SiO2 and the high-index layers 64a' and 64a" are ITO. The results from the calculations are shown in Table 10 for the transflective element described in Table 9. The sheet resistance is estimated based on the thickness of the ITO layers in the thin film stack of the transflective element 62 assuming a bulk resistivity of 160 micro-ohm cm. The NIR transmittance in the 800-1000 nm range is approximately 35%.

TABLE 9

Thickness of exemplary transflective element comprising the semiconductor layer 72

| Front Layer No. | Electro-Optic Medium 48 5-Layer Design | | |
|---|---|---|---|
| 1 | H-Index 64a' | ITO | 143.2 |
| 2 | L-Index 64b' | SiO2 | 115.6 |
| 3 | Semiconductor 72 | Si | 24.9 |
| 4 | H-Index 64a" | ITO | 133.0 |
| 5 | L-Index 64b" | SiO2 | 55.3 |
| Substrate | | Second Substrate 44 | |

In this configuration, the optical performance was calculated as listed in Table 10.

TABLE 10

Optical performance for transflective element 62 comprising the semiconductor layer 72 shown in Table 9

| | Visible | | | NIR | Sheet | | |
|---|---|---|---|---|---|---|---|
| | Reflectance | Transmittance | Absorption | Transmittance | Resistance | SF | FOM |
| Y | 55 | 15.69 | 29.31 | 35 | 9.5 | 3.5 | 3.7 |
| L* | 79.04 | 46.57 | | | | | |
| a* | −2.5 | 1.9 | | | | | |
| b* | 4.5 | 10.27 | | | | | |

In yet another example, the thicknesses of the layers of the transflective element 62 were optimized to attain a visible reflectance of 50% and reasonable reflected color. In this example, the center high-index layer 64a" and 64a'" is subdivided into three sub-layers comprising ITO, Si and ITO. The semiconductor 72 is of silicon. The low-index layers 64b' and 64b" are SiO2 and the high-index layers 64a' and 64a" are ITO. The results from the calculations are shown in Table 12 for the transflective element 62 described in Table 11. The sheet resistance is estimated based on the thickness of the ITO layers in the thin film stack of the transflective element 62 assuming a bulk resistivity of 160 micro-ohm cm. The NIR transmittance in the 800-1000 nm range is approximately 62%.

TABLE 11

Thickness of exemplary transflective element comprising the semiconductor layer 72

| Front Layer No. | Electro-Optic Medium 48 7-Layer Design | | |
| --- | --- | --- | --- |
| 1 | H-Index 64a' | ITO | 117.6 |
| 2 | L-Index 64b' | SiO2 | 118.3 |
| 3 | H-Index 64a" | ITO | 18.4 |
| 4 | Semiconductor 72 | Si | 8.0 |
| 5 | H-Index 64a'" | ITO | 64.4 |
| 6 | L-Index 64b" | SiO2 | 62.2 |
| 7 | Semiconductor 72 | Si | 9.1 |
| Substrate | Second Substrate 44 | | |

In this configuration, the optical performance was calculated as listed in Table 12.

TABLE 12

Optical performance for transflective element 62 comprising the semiconductor layer 72 shown in Table 11

| | Visible | | | NIR | Sheet | | |
| --- | --- | --- | --- | --- | --- | --- | --- |
| | Reflectance | Transmittance | Absorption | Transmittance | Resistance | SF | FOM |
| Y | 50.0 | 16.5 | 33.6 | 62 | 8.0 | 3 | 7.8 |
| L* | 76.1 | 47.6 | | | | | |
| a* | −2.5 | 4.5 | | | | | |
| b* | 4.5 | 6.0 | | | | | |

In yet another example, the thicknesses of the layers of the transflective element 62 were optimized to attain a visible reflectance of 60% and reasonable reflected color. In this example, the semiconductor layer 72 is located beside the second substrate 44. The semiconductor 72 is of silicon. The low-index layers 64b' and 64b" are SiO2 and the high=index layers 64a' and 64a" are ITO. In this example, the center high-index layer 64a" and 64a'" is subdivided into three sub-layers comprising ITO, Si and ITO. The results from the calculations are shown in Table 14 for the transflective element 62 described in Table 13. The sheet resistance is estimated based on the thickness of the ITO layers in the thin film stack of the transflective element 62 assuming a bulk resistivity of 160 micro-ohm cm. The NIR transmittance in the 800-1000 nm range is approximately 42%.

TABLE 13

Thickness of exemplary transflective element comprising the semiconductor layer 72

| Front Layer No. | Electro-Optic Medium 48 7-layer Design | | |
| --- | --- | --- | --- |
| 1 | H-Index 64a' | ITO | 119.1 |
| 2 | L-Index 64b' | SiO2 | 138.1 |
| 3 | H-Index 64a" | ITO | 12.4 |
| 4 | Semiconductor 72 | Si | 11.4 |
| 5 | H-Index 64a'" | ITO | 59.8 |
| 6 | L-Index 64b" | SiO2 | 56.3 |
| 7 | Semiconductor 72 | Si | 23.6 |
| Substrate | Second Substrate 44 | | |

In this configuration, the optical performance was calculated as listed in Table 14.

TABLE 14

Optical performance for transflective element 62 comprising the semiconductor layer 72 shown in Table 13

| | Visible | | | NIR | Sheet | | |
| --- | --- | --- | --- | --- | --- | --- | --- |
| | Reflectance | Transmittance | Absorption | Transmittance | Resistance | SF | FOM |
| Y | 60.0 | 6.0 | 34.1 | 42 | 8.4 | 10 | 5 |
| L* | 81.8 | 29.3 | | | | | |
| a* | −2.5 | 2.6 | | | | | |
| b* | 4.5 | 0.9 | | | | | |

Figure 10:
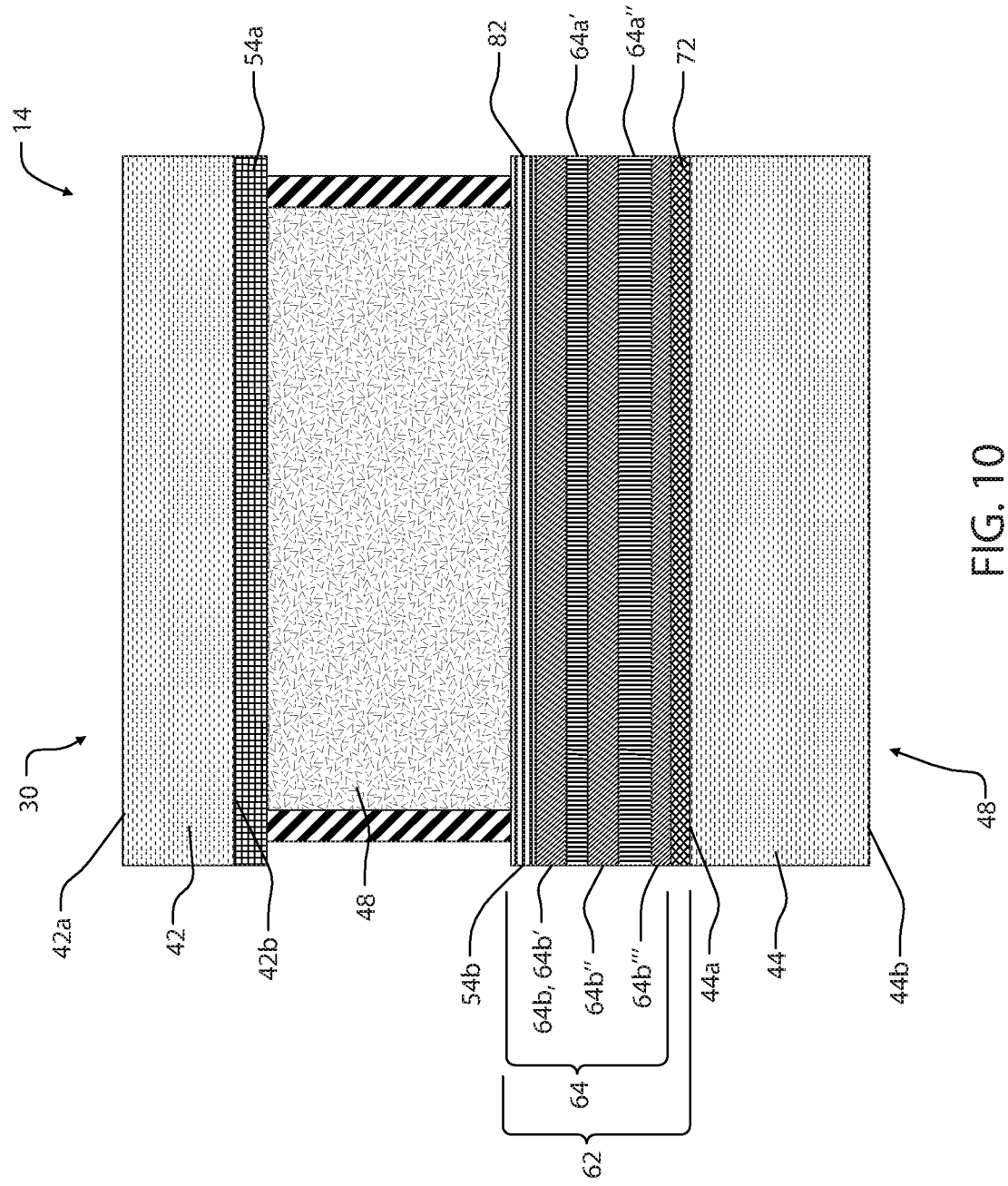
FIG. 10 is a side cross-sectional view of an exemplary embodiment of an electro-optic assembly with a transflective coating disposed on a third surface comprising a metal layer.

Referring now to FIG. 10, the transflective element 62 may further comprise a metal layer 82 in addition to the layers described in reference to FIG. 9. Unexpectedly, the metal layer 82 can boost the reflectance of the electro-optic assembly 14 without significantly affecting the NIR transmittance in contradistinction to related art. The metal layer 82 may also provide for the electrical conductivity required for the transflective element 62.

In the example configuration shown in Table 15, the thicknesses of the layers of the transflective element 62 were optimized to attain a visible reflectance of 55% and reasonable reflected color. In this example, the semiconductor layer 72 is located beside the second substrate 44. The semiconductor 72 is of silicon. The low-index layer 64b' is SiO2 and the high-index layer 64a' is a silver-gold alloy with 7% gold. The results from the calculations are shown in Table 16 for the transflective element 62 described in Table 15. The sheet resistance is estimated based on the thickness of the silver gold alloy in the thin film stack assuming a bulk resistivity of 6 micro-ohm cm. The NIR transmittance in the 800-1000 nm range is approximately 45%. In the examples wherein the high index layer comprises a metal or metal alloy layer such as described above, it is understood that the embodiment is not limited to silver-gold alloys with a 7% gold content. The metal may comprise silver and may contain additional elements. Alternatively, the layer may comprise a metal or alloy wherein the real part of the refractive index is less than about 1.5, or less than 1, or less than 0.5.

TABLE 15

Thickness of exemplary transflective element comprising the semiconductor layer 72

| Front Layer No. | Electro-Optic Medium 48 3-Layer Design | | |
|---|---|---|---|
| 1 | H-Index 64a'/ Metal layer 82 | Ag/Au 7x | 2.0 |
| 2 | L-Index 64b' | SiO2 | 51.0 |
| 3 | Semiconductor 72 | Si | 19.9 |
| Substrate | Second Substrate 44 | | |

In this configuration, the optical performance was calculated as listed in Table 16.

TABLE 16

Optical performance for transflective element 62 comprising the semiconductor layer 72 shown in Table 15

| | Visible | | | NIR | Sheet | | |
|---|---|---|---|---|---|---|---|
| | Reflectance | Transmittance | Absorption | Transmittance | Resistance | SF | FOM |
| Y | 54.9 | 19.4 | 25.7 | 45 | 30.5 | 2.8 | 1.5 |
| L* | 79.0 | 51.2 | | | | | |
| a* | −3.6 | 4.2 | | | | | |
| b* | 4.8 | 17.1 | | | | | |

Another example configuration is shown in Table 17. In this example, the thicknesses of the layers of the transflective element 62 were optimized to attain a visible reflectance of 60% and reasonable reflected color. The semiconductor 72 is of silicon. The low-index layers 64b' and 64b" are of SiO2 and the high-index layers 64a' and 64a" are of ITO. Additionally, the metal layer 82 is a silver-gold alloy with 7% gold. The results from the calculations are shown in Table 18 for the transflective element 62 described in Table 17. The sheet resistance is estimated based on the thickness of the transflective element 62 assuming a bulk resistivity of 6 micro-ohm cm combined with the thickness of the ITO layers assuming a bulk resistivity of 160 micro-ohm cm. The NIR transmittance in the 800-1000 nm range is approximately 40%.

TABLE 17

Thickness of exemplary transflective element comprising the semiconductor layer 72

| Front Layer No. | Electro-Optic Medium 48 6-Layer Design | | |
|---|---|---|---|
| 1 | Metal Layer 82 | Ag/Au 7x | 1.6 |
| 2 | H-Index 64a' | ITO | 20.0 |
| 3 | L-Index 64b' | SiO2 | 55.0 |
| 4 | H-Index 64a" | ITO | 57.2 |
| 5 | L-Index 64b" | SiO2 | 96.6 |
| 6 | Semiconductor 72 | Si | 25.1 |
| Substrate | Second Substrate 44 | | |

In this configuration, the optical performance was calculated as listed in Table 18.

TABLE 18

Optical performance for transflective element 62 comprising the semiconductor layer 72 shown in Table 17

| | Visible | | | NIR | Sheet | | |
|---|---|---|---|---|---|---|---|
| | Reflectance | Transmittance | Absorption | Transmittance | Resistance | SF | FOM |
| Y | 59.2 | 14.9 | 26.0 | 40 | 13.4 | 4 | 3 |
| L* | 81.4 | 45.5 | | | | | |
| a* | −2.9 | 4.4 | | | | | |
| b* | 4.9 | 17.3 | | | | | |

Yet another example configuration is shown in Table 19. In this example, the thicknesses of the layers of the transflective element 62 were optimized to attain a visible reflectance of 69% and reasonable reflected color. The semiconductor 72 arranged beside the second substrate 44 and is formed of silicon. The low-index layers 64b' and 64b'' are of SiO2 and the high-index layers 64a' and 64a'' are of TiO2 and ITO, respectively. Additionally, the metal layer 82 is a silver-gold alloy with 7% gold. The results from the calculations are shown in Table 20 for the transflective element 62 described in Table 19. The sheet resistance is estimated based on the thickness of the silver gold alloy in the thin film stack assuming a bulk resistivity of 6 micro-ohm cm combined with the thickness of the ITO layers assuming a bulk resistivity of 160 micro-ohm cm. The NIR transmittance in the 800-1000 nm range is approximately 60%.

Still referring to FIG. 10, another example configuration is shown in Table 21. In this example, the thicknesses of the layers of the transflective element 62 were optimized to attain a visible reflectance of 63% and reasonable reflected color. The semiconductor 72 arranged beside the metal layer 82 and is formed of silicon. The low-index layers 64b' and 64b'' are of SiO2 and the high-index layers 64a' and 64a'' are of TiO2 and ITO, respectively. Additionally, the metal layer 82 is a silver-gold alloy with 7% gold. The results from the calculations are shown in Table 22 for the transflective element 62 described in Table 21. The sheet resistance is estimated based on the thickness of the silver gold alloy in the thin film stack assuming a bulk resistivity of 6 micro-ohm cm combined with the thickness of the ITO layers assuming a bulk resistivity of 160 micro-ohm cm. The NIR transmittance in the 800-1000 nm range is approximately 53%. In this example, the thickness of ITO layer is increased to reduce the sheet resistance of transflective element 62.

TABLE 19

Thickness of exemplary transflective element comprising the semiconductor layer 72

| Front Layer No. | Electro-Optic Medium 48 6-Layer Design | | |
|---|---|---|---|
| 1 | Metal Layer 82 | Ag/Au 7x | 3.3 |
| 2 | H-Index 64a' | ITO | 16.3 |
| 3 | L-Index 64b' | SiO2 | 69.0 |
| 4 | H-Index 64a'' | TiO2 | 50.4 |
| 5 | L-Index 64b'' | SiO2 | 84.5 |
| 6 | Semiconductor 72 | Si | 20.8 |
| Substrate | Second Substrate 44 | | |

In this configuration, the optical performance was calculated as listed in Table 20.

TABLE 20

Optical performance for transflective element 62 comprising the semiconductor layer 72 shown in Table 19

| | Visible | | | NIR | Sheet | | |
|---|---|---|---|---|---|---|---|
| | Reflectance | Transmittance | Absorption | Transmittance | Resistance | SF | FOM |
| Y | 68.7 | 9.5 | 21.8 | 60 | 15.2 | 7.2 | 4 |
| L* | 86.4 | 36.8 | | | | | |
| a* | −2.5 | 6.1 | | | | | |
| b* | 4.5 | 11.5 | | | | | |

TABLE 21

Thickness of exemplary transflective element comprising the semiconductor layer 72

| Front Layer No. | Electro-Optic Medium 48 6-Layer Design | | |
|---|---|---|---|
| 1 | Metal Layer 82 | Ag/Au 7x | 5.0 |
| 2 | H-Index 64a' | Si | 24.2 |
| 3 | L-Index 64b' | SiO2 | 115.2 |
| 4 | H-Index 64a'' | TiO2 | 50.1 |
| 5 | L-Index 64b'' | SiO2 | 184.4 |
| 6 | Semiconductor 72 | ITO | 196.0 |
| Substrate | Second Substrate 44 | | |

In this configuration, the optical performance was calculated as listed in Table 22.

TABLE 22

Optical performance for transflective element 62 comprising the semiconductor layer 72 shown in Table 21

| | Visible | | | NIR | Sheet | | |
|---|---|---|---|---|---|---|---|
| | Reflectance | Transmittance | Absorption | Transmittance | Resistance | SF | FOM |
| Y | 63.1 | 10.4 | 26.5 | 53 | 4.9 | 6.1 | 10.8 |
| L* | 83.5 | 38.6 | | | | | |
| a* | −3.1 | −1.2 | | | | | |
| b* | 5.4 | 11.2 | | | | | |

Figure 11:
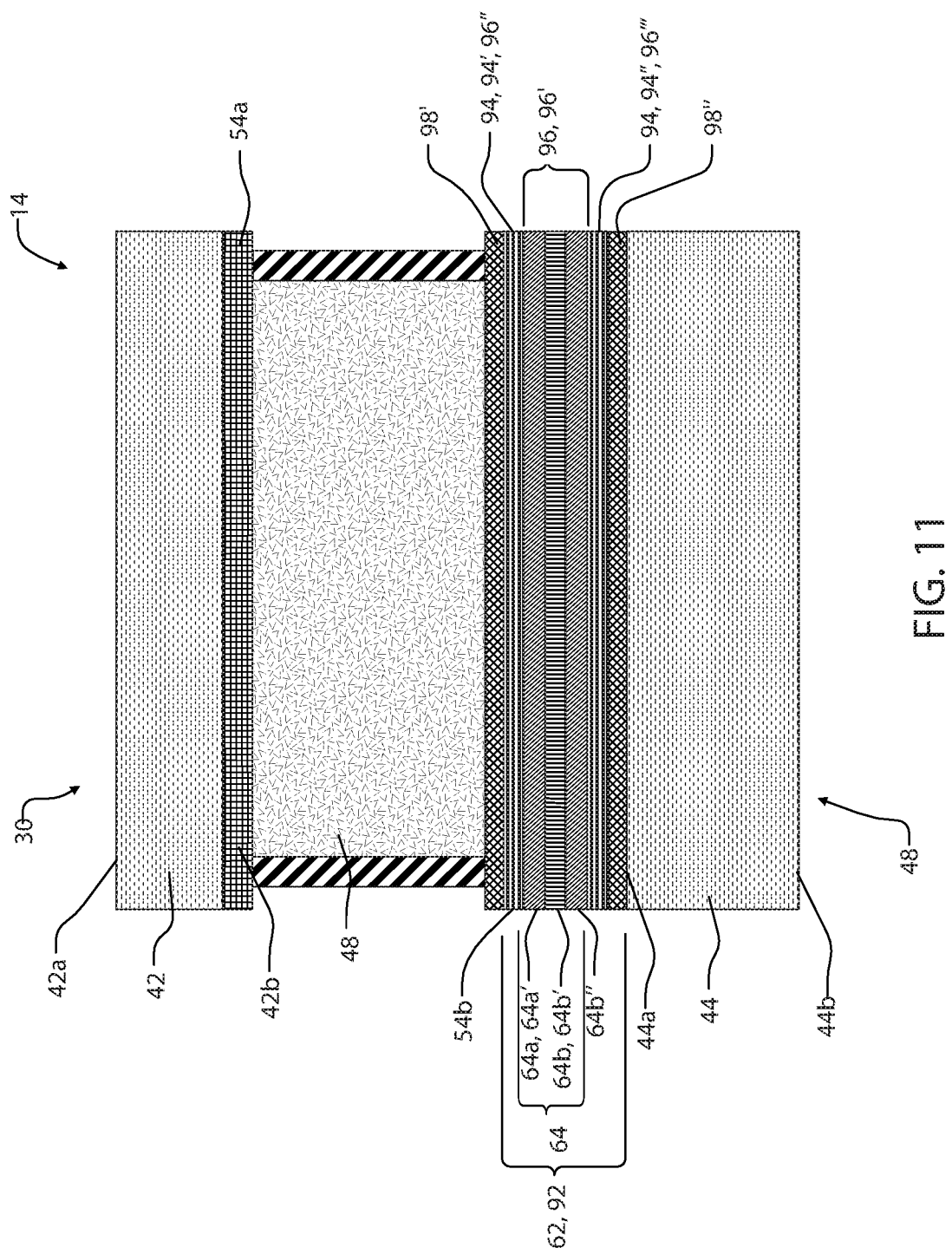
FIG. 11 is a side cross-sectional view of an exemplary embodiment of an electro-optic assembly with a transflective coating disposed on a third surface comprising a color tuning layer.

Referring now to FIG. 11, a block diagram of yet another embodiment of the transflective element 62 is shown. In some embodiments, the transflective coating 64 may apply the Fabry-Pérot optical resonance effect to create a broad, high reflectance band separated by narrow wavelength bands. In this configuration, the transflective coating may have an NIR transmission significantly higher than metal layers (e.g., the metal layer 82) of an equivalent total metal thickness. By controlling the thicknesses of the layers of the transflective element 62 and the refractive indices of the underlying layers, the disclosure may provide for the spectral transmittance of the transflective element 62 to be tuned over a wide range. In particular, it may be possible to choose materials and thicknesses such that the transflective element 62 comprises the following: a low sheet resistance, a relatively high transmission in the NIR light range, a high reflectance for wavelengths in the visible light range, and a relatively neutral reflected color. In some embodiments, the transflective element 62 may also provide a narrow range of near infrared transmission or spectral filtering. Additionally, the transflective element 62 may provide for a directional transmission pattern or directional filtering in order to minimize noise from other near infrared sources or from sources away from a field of view of interest of the image sensor 16.

In some embodiments from the manufacturability perspective, it may be beneficial to minimize a number of layers of the transflective element 62. Accordingly a metal-insulator-metal (MIM) based transflective coating may be utilized in the transflective element 62 to limit the number of layers, which may reduce the manufacturing cost of the transflective element 62. Additionally, utilizing an MIM structure may provide for improved production efficiency, and a low sheet resistance, which may result in a faster electro-optic response.

FIG. 11 depicts the cross section diagram of the electro-optic assembly 14. Referring to FIG. 11, the electro-optic assembly 14 may correspond to an electrochromic element or mirror incorporating the transflective element 62. In the example of FIG. 11, the transflective element 62 may correspond to a MIM transflective coating 92 disposed on the third surface 44a of the second substrate 44. The electro-optic assembly 14 may comprise a variety of like components previously discussed herein and identified with like reference identifiers for clarity. The MIM transflective coating 92 is a multilayer stack comprising a plurality of metal layers 94. More specifically, the MIM transflective coating 92 comprises a first metal (M1) layer 94', an insulator layer 96, and a second metal (M2) layer 94". The simplest stack comprises layers 94', 96' and 94". The insulator layer 96 may consist of a single layer or it may comprise a first low-index ($I_1$) layer 64b', the first high-index ($I_2$) layer 64a', and a second low-index ($I_3$) layer 64b".

In some embodiments, a narrow infrared transmission range provided by the MIM structure may improve a capability of the transflective element 62 to filter out NIR radiation that is not desirable for the application. The other NIR radiation may correspond to NIR radiation that is not output from the light sources 18. For example, a near-infrared spectral range of interest may be defined by a center frequency as $\lambda_{NIR} \pm 40$ nm. The average transmission at normal incidence over the NIR spectral range of interest may be defined as $T_{NIR}$.

The physical thickness d for the layers or stacks of the transflective element 62 may be expressed in units of nanometers (nm), while optical thicknesses may be expressed in units of a fraction of a reference wavelength, for example, 550 nm. Generally, the optical thickness is expressed herein in full wave optical thickness (FWOT), which is described by Equation 2.

$$FWOT = \frac{d * n(\lambda)}{\lambda} \quad (2)$$

When materials are exposed to an external electromagnetic field of a certain frequency, such as light, materials respond by polarizing, and this polarization depends on the wavelength of the light. This response is called relative permittivity, and is described by the wavelength dependent complex dielectric function $\varepsilon(\lambda)$. The dielectric function is expressed as a complex number with a real $\varepsilon_1$ and imaginary part $\varepsilon_2$. In this regard, it should be understood that $\varepsilon^M$ and $\varepsilon^I$ refer to the complex dielectric function of the metal 94 or the insulator 96, respectively.

The complex refractive index N, is a wavelength dependent material property where the real part corresponds to the index of refraction n, and the imaginary part is the extinction coefficient k. The index of refraction is indicative of the phase velocity of light in a medium with respect to the speed of light in vacuum and the extinction coefficient is related to the material capability to absorb light. In general, for non-magnetic materials the complex permittivity and the complex refractive index are related as expressed by Equation 3.

$$N^2 = (n+ik)^2 = \varepsilon_1 + i\varepsilon_2 = \varepsilon \quad (3)$$

A Fabry-Pérot optical cavity generally consists of a MIM structure where a low absorption material is sandwiched between two highly reflective surfaces forming an optical cavity. Multiple reflections of the light in the cavity enable a certain wavelength to form standing waves or a resonance when the light wave constructively interferes with multiple reflected waves without serious loss due to a negligible absorption in the cavity. The resonance condition is satisfied when for a given angle of incidence θ, the phase difference φ of the incoming and reflected wave is an integer multiple of 2π. This condition is related to the cavity thickness as expressed by Equation 4.

$$\varphi = 2\ m\pi = \frac{2\ \pi n(\lambda)}{\lambda} 2\ d\cos(\theta) \quad (4)$$

Using Equation 2 and 4, it is possible to see that for m=1, the resonance condition is met for a FWOT=0.5. The full wave optical thickness (FWOT) may be between about 0.4 to 0.7, or between about 0.45 and 0.65. The lower FWOT values position the NIR transmittance band to shorter wavelengths while the higher FWOT values position the NIR transmittance band to longer wavelength.

For thin layers of metal the MIM structure can become practically transparent for narrow spectral bands using resonant photon tunneling via the surface plasmon-polariton effect. In particular, this enhanced transparency occurs for wavelengths where one of the real part of the dielectric function is positive, and the other negative, i.e., $\varepsilon_1^M \varepsilon_1^I < 0$, and when the absolute value of the positive dielectric function is lower than the negative one, i.e., $\varepsilon_1^M + \varepsilon_1^I < 0$.

Figure 12A:
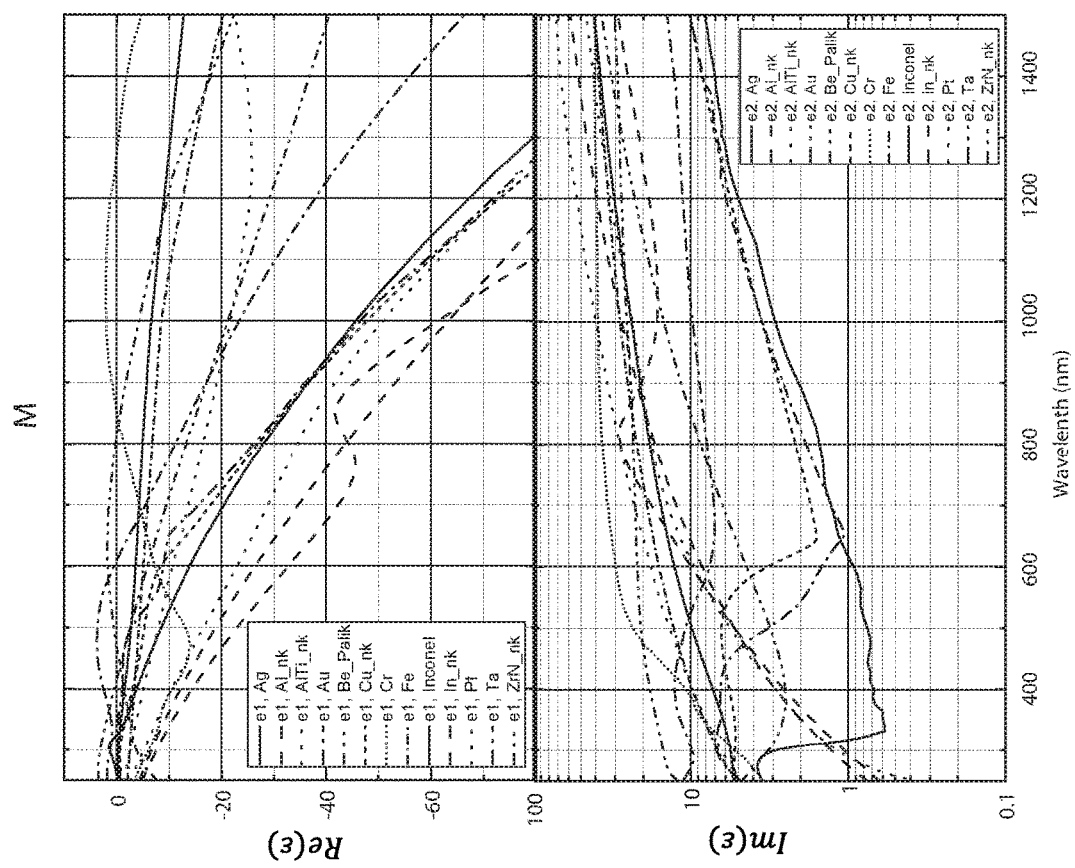
FIG. 12A is a plot of real and imaginary parts of a dielectric function of different metal and insulator materials of a transflective coating.
Figure 12B:
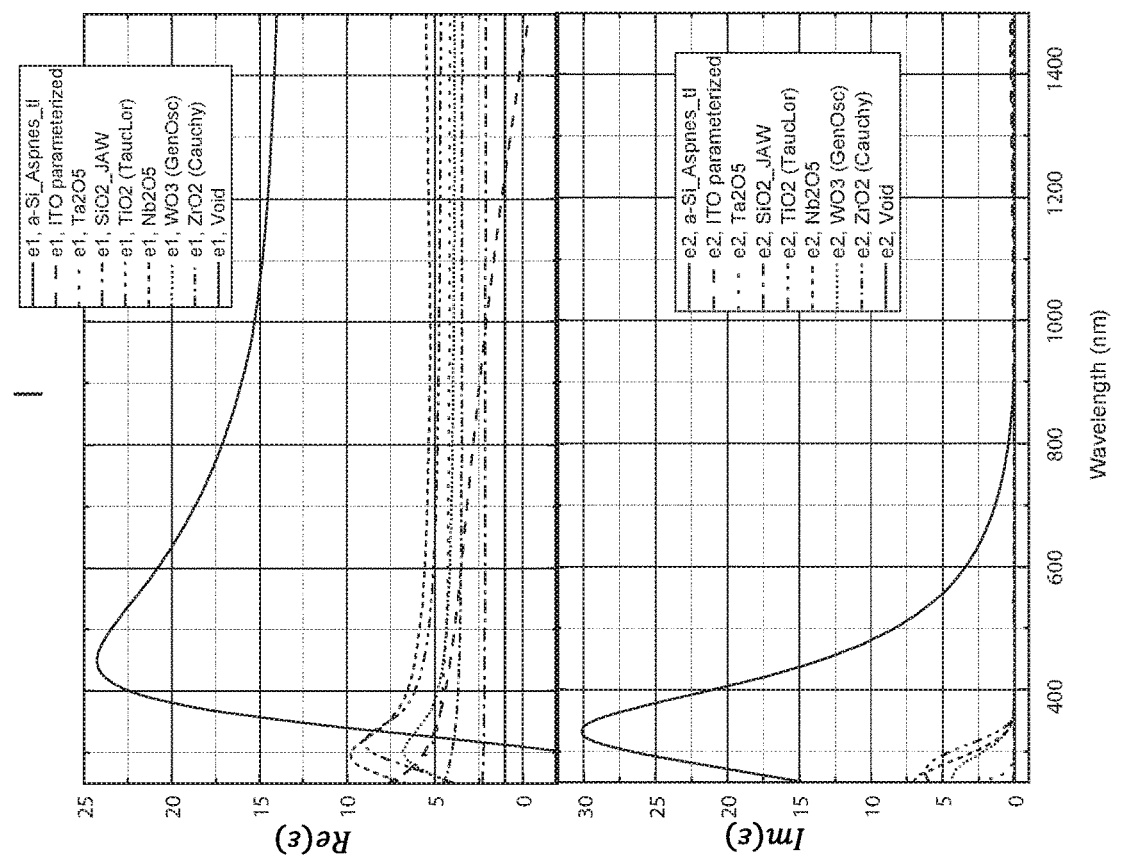
FIG. 12B is a plot of real and imaginary parts of a dielectric function of different metal and insulator materials of a transflective coating continued from FIG. 11A.

Referring now to FIGS. 12A and 12B, plots of the real and imaginary parts of the dielectric function of different metal and insulator materials are shown. The plots demonstrate that the insulator materials with a small absorption are materials with a positive real dielectric function and that most metals have a negative real dielectric function in the visible spectral range. It is also possible to see that silver is one of the metals with the lowest imaginary part of the dielectric function, which corresponds to a low absorption.

In the CIE Lab color space the human perceived color can be described mathematically using the color coordinates a* and b*, which represent true neutral color values at a*=b*=0. The red and green opposite colors are represented along the a* axis and the yellow and blue opposite colors are represented along the b* axis. The amount of color change between two color coordinates $(a_1, b_1)$ and $(a_2, b_2)$ can be expressed by the change in Chroma as expressed by Equation 4. It is to be understood that the color of the reflected light is generally different than the color of the transmitted light and that a subscript letter r or t denotes the case.

$$\Delta C^* = \sqrt{(\Delta a^*)^2 + (\Delta b^*)^2} \quad (4)$$

For surfaces that exhibit a change of color in dependence of parameters, such as the angle of incidence, it is useful to define the color variation as the maximum change in Chroma max($\Delta C^*$) between the Chroma at normal incidence and the Chroma in the range of angles of incidence of interest, for example from about 0 to 30 degrees, 0 to 45 degrees, or 0 to 60 degrees. For applications where color stability over angle of incidence is desired, a small number for max($\Delta C^*$) is preferred. In the CIE 1931 XYZ color space, the eye-sensitivity weighted response of a given reflectance or transmission spectrum is called the luminance and is represented by Y.

Another desirable attribute for a transflective stack with enhanced $T_{NIR}$ is to have SF in the visible spectral range. A high SF is desirable to hide or camouflage components like NIR cameras or light sources or any other component behind an electro-optic assembly and prevent use of, or minimize the requirements of, an opacifier or appliqués or other methods to minimize the visible transmission in areas of the element where a high $T_{VIS}$ is not useful.

The metal layers 94 of the MIM coating may comprise a material with Re($\varepsilon_M$)<0 in the spectral range of interest, which includes one or more of silver, gold, chromium copper, nickel palladium, platinum, iridium, rhodium, ruthenium, aluminum, molybdenum, Inconel, indium, osmium, tungsten, rhenium, stainless steel, tantalum, titanium, any other platinum group metals, zirconium, vanadium, AlSi alloys, and alloys and/or combinations thereof. It will be understood that any of the aforementioned metals may be utilized for one or for both M-layers of the transflective element 62. Due to the low absorption in the visible spectral range, silver alloys may be utilized for one or more M-layers with content greater than 20%, and, more specifically, may be higher than 50%. Some metals like tantalum, beryllium and chromium have a positive Re($\varepsilon_M$) in the visible and part of the near infrared range or in the near infrared range, and negative for longer wavelengths. Materials for M-layers may be preferred for surface plasmon-polariton tunneling for wavelengths where the condition Re($\varepsilon_M$)<0 is met.

The insulator layers 96 in the MIM structure comprise materials with a positive real part of the dielectric function Re($\varepsilon_I$)>0 in the spectral range of interest, and depending on the application with low or high optical absorption. For this particular application, the nominal insulator layers may or may not have a measurable electrical conductivity. Examples of materials that can be used as the insulator layers 96 may be selected from one or more of the following: MgF2, SiO2, TiO2, Nb2O5, Al2O3, TiSiO4, ZrO2, HfO2, Ta2O5, WO3, IrO2, ZnO2, as well as transparent conductive oxides, such as Nb:TiO2, indium tin oxide (ITO), indium zinc oxide (IZO), indium gallium zinc oxide (IGZO), aluminum zinc oxide (AZO), semiconductors like Si or SiC, or other material with a refractive index between about 1 and about 5. It will be understood that any of the aforementioned materials with a positive real part of the dielectric function may be utilized for one or any I-layers of the MIM coatings of the present disclosure.

Referring now to FIG. 13, exemplary parameters related to the optical and electrical performance for MIM stacks that may be incorporated in the electro-optic assembly 14 are shown. The MIM stacks may comprise a 70% reflectance and with different configurations of the insulator layers 96, such as a single layer of SiO2, a single layer of TiO2, a stack of SiO2/ITO/SiO2, and a stack of SiO2/TiO2/SiO2. The material used for the metal layers 94' and 94" is a silver/gold alloy with 7% gold content. For all the resonator examples, the same metal was used but it is to be understood that different metals can be used as well. It is possible to observe that introducing a high-index layer in the center of the stack helps to create a more neutral reflected color and a better color stability as seen by the lower change in Chroma. In addition, the optical thickness of the resonator cavity for a reference wavelength of 550 nm is given by the sum of the insulator layers $I_1$ (84), $I_2$ (86), and $I_3$ (84') with values between 0.4 and 0.6, which is close to the expected 0.5. The transmission in the near infrared range is also improved with the use of a high-index layer in between low-index layers, as seen by the increased average NIR transmission of 58.2% at $\lambda_{NIR}$=820 nm for the SiO2/TiO2/SiO2 case. For comparison purposes, the performance parameters of a Metal-Insulator (MI) stack are also included. This corresponds to a structure without a resonating cavity but that also has 70% reflectance and the same amount of metal as the MIM structure with a SiO2/TiO2/SiO2 insulating stack, both with 20.2 nm of silver. It is possible to see that despite both structures have the same materials, same metal amounts and same visible reflectance values, the transmission in the NIR from the MIM structure is greatly enhanced, as seen by the FOM going from 5 for a non-resonating structure up to values above 20 for MIM structures.

Figure 14:
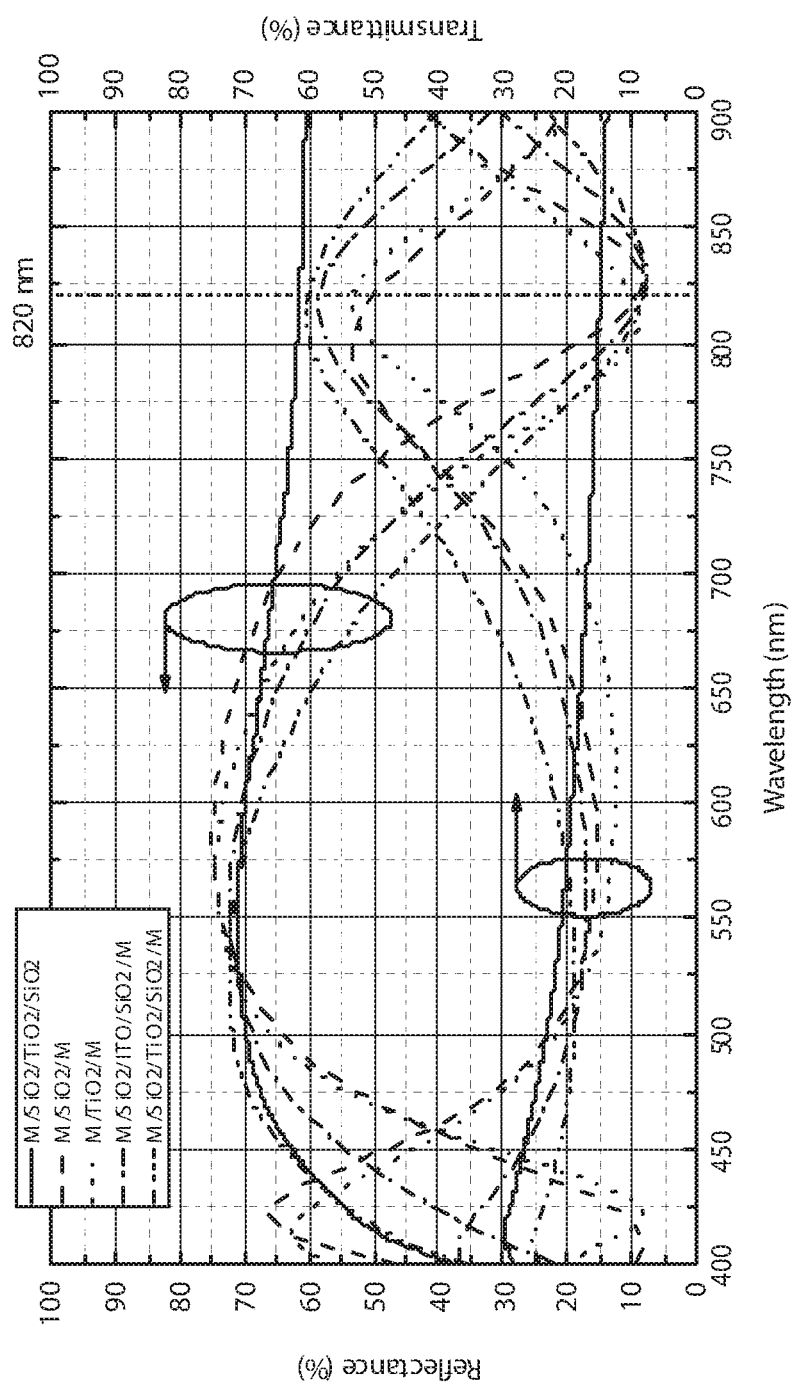
FIG. 14 is a plot demonstrating a reflectance and transmission dependence of metal-insulator structures.

Referring now to FIG. 14, a plot is shown demonstrating a reflectance and transmission dependence of MIM and MI structures described in Table 23 at normal incidence, where the enhanced NIR transmission found in the MIM structures is clearly observed near 820 nm and absent in the MI.

Referring again to FIG. 11, the MIM transflective coating 92 may further comprise a first color tuning isolator 98'. The first color tuning isolator layer 98' (I$_4$) may be disposed between the MIM transflective coating 92 and the electro-optic medium 48. In this configuration, the MIM transflective coating 92 may form an MIMI transflective coating. It will be understood that the material of the first color tuning layer 98' may comprise materials previously listed for the insulator layers 96. Similarly, a second color tuning layer 98" may be disposed between the MIM transflective coating 92 and the second substrate 44. In this configuration, the MIM transflective coating 92 may form an IMIM transflective coating. Accordingly, the electro-optic assembly 14 may comprise the first insulator layer 96' and a second insulator layer 96" or a third insulator layer 96'''.

Figure 15:
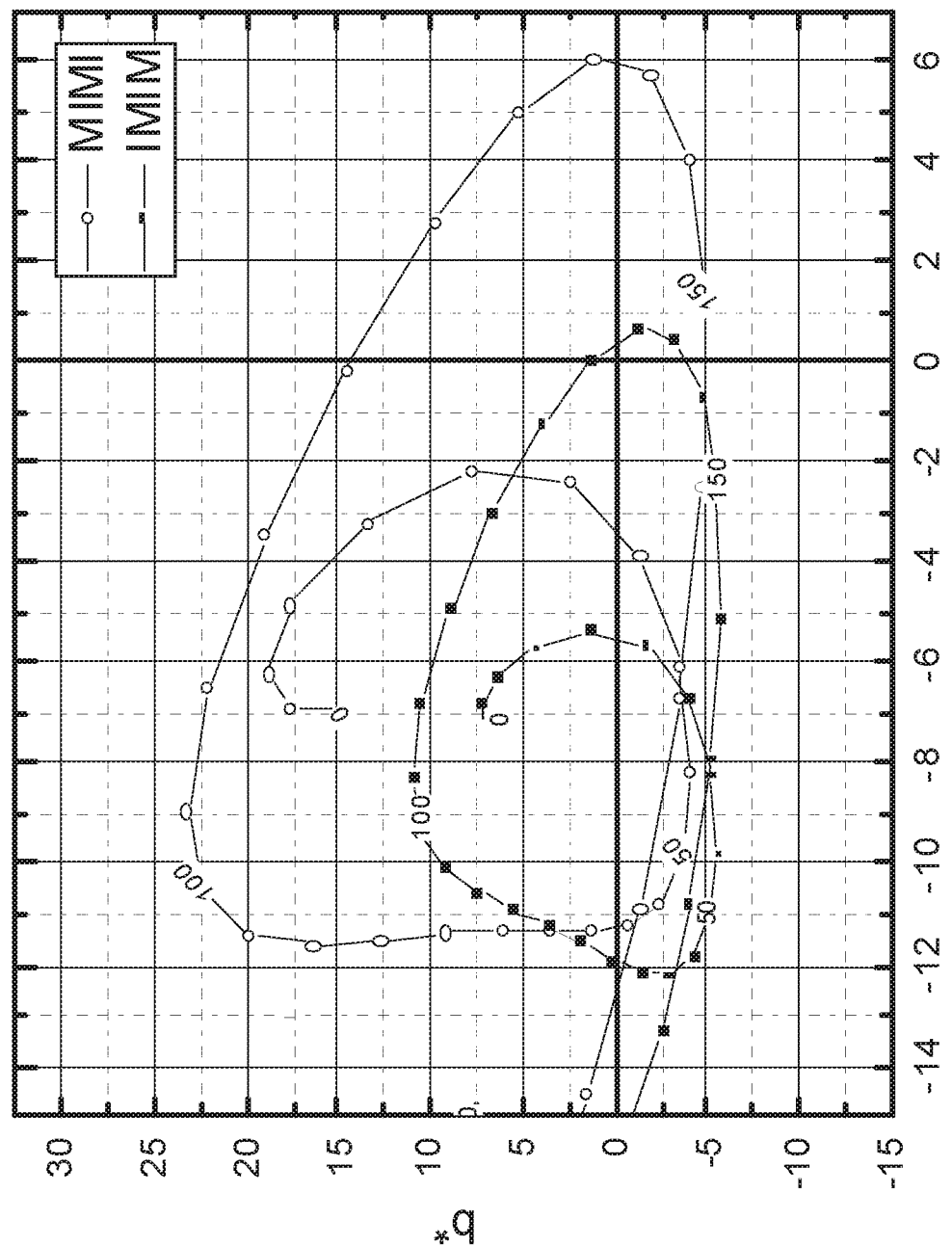
FIG. 15 is a plot of an exemplary color variation of metal-insulator transflective coatings.
Figure 16:
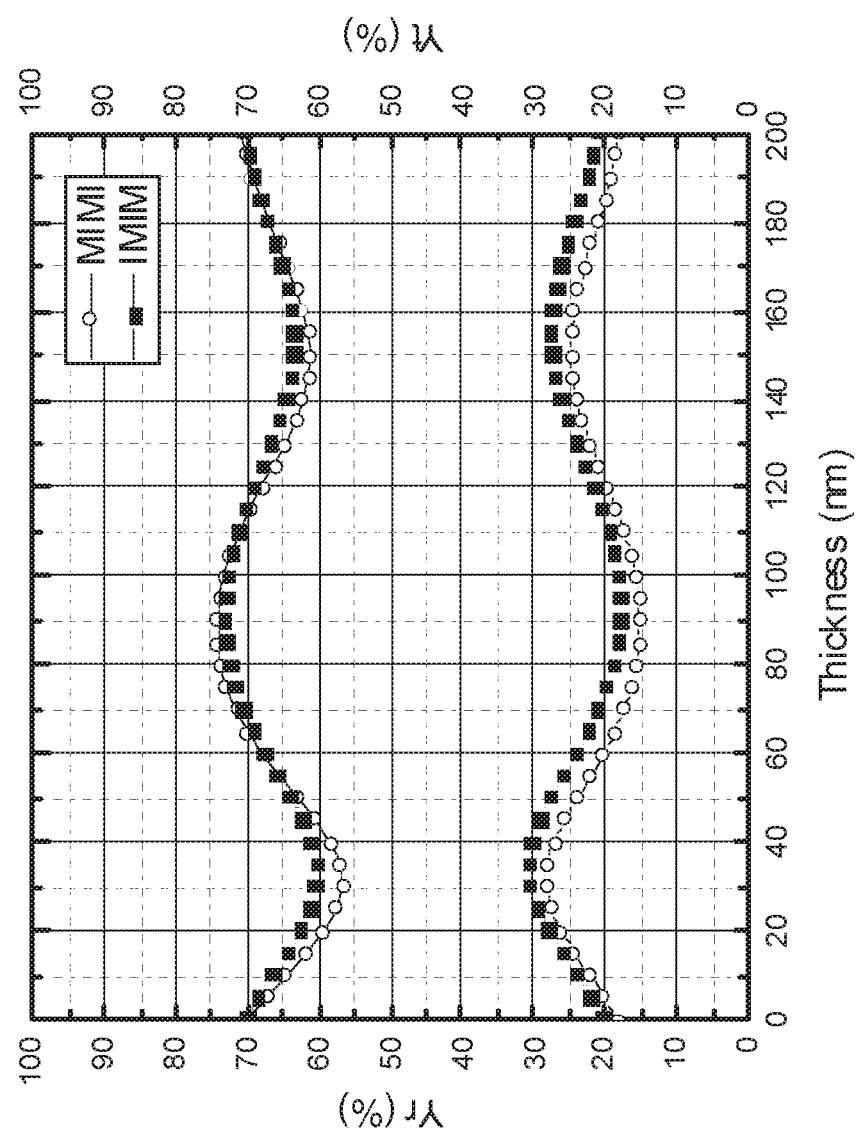
FIG. 16 is a plot demonstrating a reflectance and transmission of a transflective coating in dependence on a thickness of a color tuning layer.

Referring now to FIG. 15, a plot of an exemplary color variation of MIMI and IMIM transflective coatings is shown. The coatings may be incorporated in the electro-optic assembly 14 as discussed in reference to the MIM transflective coating 92 shown in FIG. 11 by varying the thickness of the color tuning insulators 98 and 98'. The materials for the color tuning layers 98 in these particular examples are ITO for the MIMI stack and TiO2 for the IMIM stack. The thickness parameters of the SiO2 and TiO2 layers forming the MIMI and IMIM resonator cavity are given in correspondence to structure 3 and 4 of Table 23. If thickness parameter of the color tuning layer is varied while leaving all other thickness parameters constant, the reflectance and transmission of the stack changes in dependence on the thickness of the color tuning layers 98, as depicted in FIG. 16. It is possible to observe that there is an oscillatory modulation in transmission and reflectance when the thickness of the color tuning layer for MIMI or IMIM increases. It is also possible to observe that the transmission is lower for the MIMI case; this is because the ITO is more absorbing than TiO2, and, therefore, it is possible to choose materials with absorption in order to reduce the visible transmission of the device which may be useful to increase the SF parameter. From FIGS. 15 and 16, it is possible to recognize that, in order to have a neutral color and a certain reflectance, one needs to be able to modify these two properties independently, for example via a an optimization process using an optical software, in particular of the thicknesses of the color tuning layers 98' and 98" and the metal layers 94' and 94".

Figure 17:
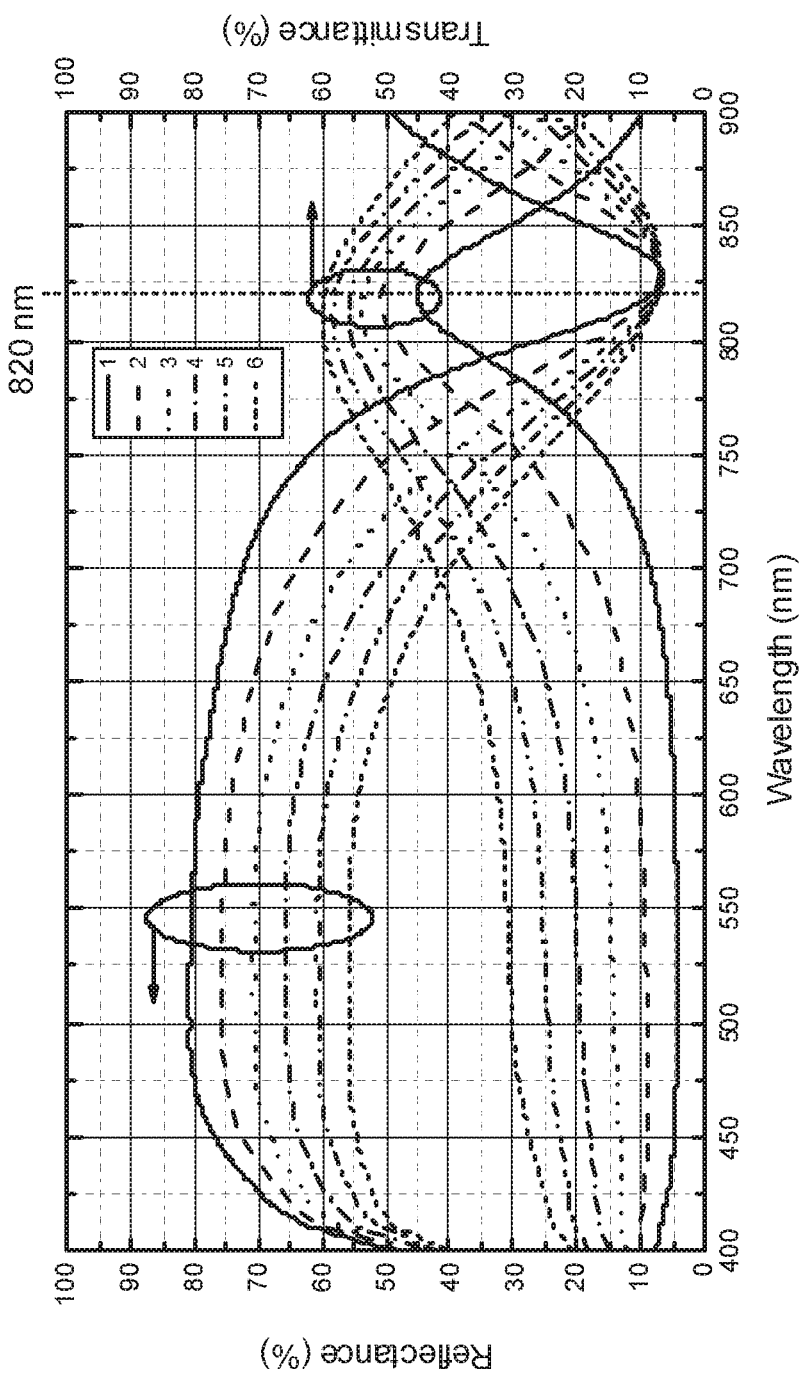
FIG. 17 is a plot demonstrating a variation of reflectance and transmittance of an exemplary transflective coating.
Figure 18:
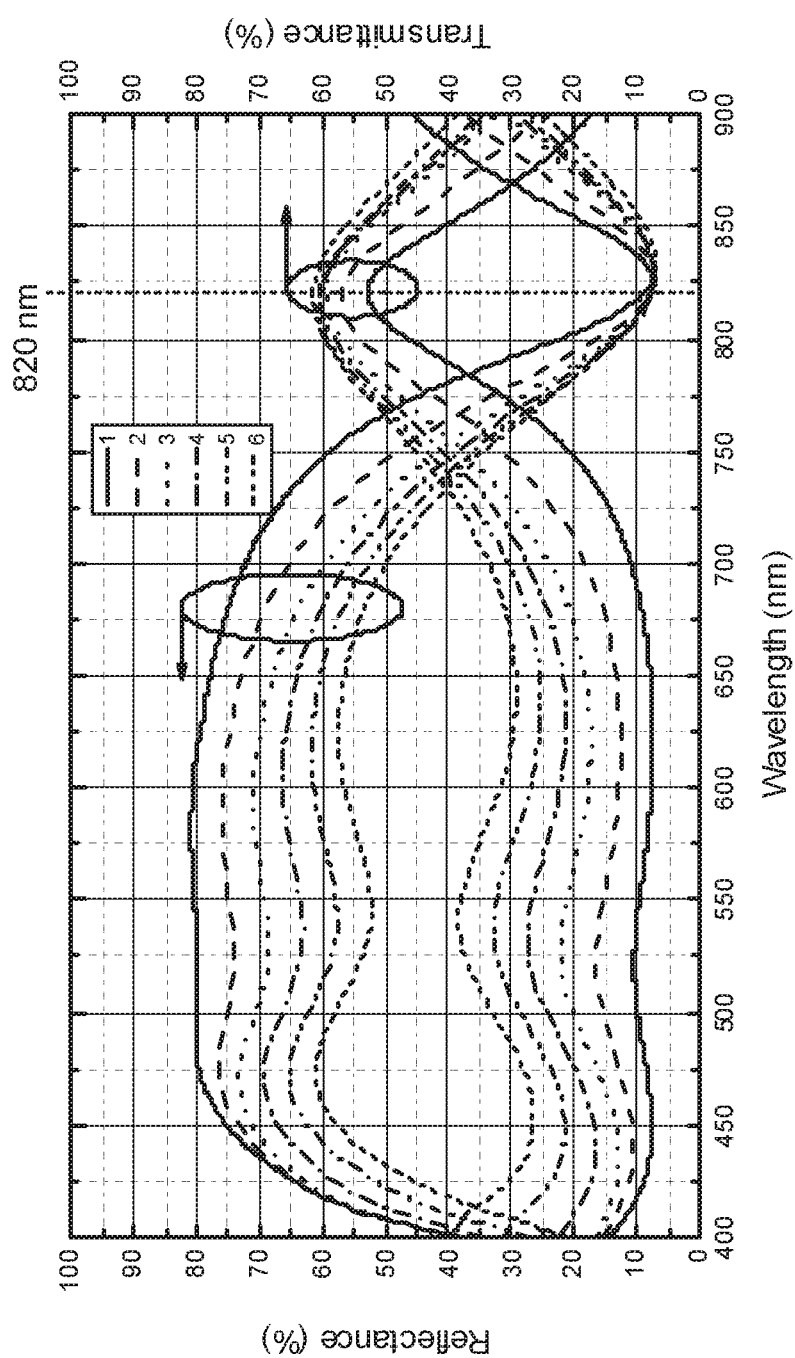
FIG. 18 is a plot demonstrating a variation of reflectance and transmittance of an exemplary transflective coating.

FIGS. 17 and 18 exemplarily demonstrate the capability of an IMIM and MIMI stack, to vary the reflectance in the visible spectral range between 55% and 80%, while keeping a reasonably neutral reflected color and the same $\lambda_{NIR}$ value; in this example, at 820 nm. Both structures have a resonator cavity with two low refractive index layers (I$_1$ and I$_3$) and one high refractive index layer (I$_2$), such that the high-index layer is sandwiched in between the other two, and the color tuning layer is also a high-index material. In this example, the low-index material is SiO2 and the high-index material is TiO2. It is possible to observe that the IMIM and MIMI stacks offer a degree of spectral filtering as the transmission decreases for wavelengths larger or shorter than $\lambda_{NIR}$. The performance and thickness parameters of the stacks corresponding to the spectra shown in FIGS. 17 and 18 are summarized in Tables 24 and 25 shown in FIGS. 19 and 20, respectively. For these two examples and for the sake of simplicity, in each stack configuration, the thickness parameter for both of the metal layers 94' and 94" is the same. Additionally, the value of the thickness parameter of both low-refractive index layers within the resonator cavity is the same. However, it shall be understood that the thickness values for these layers may differ depending on the application and manufacturing process of the electro-optic element. The metal utilized for these examples of FIGS. 17 and 18 was silver.

Based on the results in Tables 24 and 25 (shown in FIGS. 19 and 20) both MIMI and IMIM structures are capable of modulating the reflectance mainly by changing the thicknesses of the metal layers 94, while keeping a reasonably neutral reflected color. Also, the total cavity thickness is close to the predicted value for a high reflectance in the visible spectral range and varies between 0.45 and 0.55, and the color stability, as well as the FOM and SF increase for elements with high reflectance. In general, both the MIMI and IMIM structures are capable of varying the reflectance value while keeping the same $\lambda_{NIR}$ and preserving a relative color neutral reflectance. On the other hand, while the color variation versus angle of incidence decreases with increasing visible reflectance, the color at normal incidence tends to be slightly less neutral. Both the MIMI and IMIM structures have a relatively high T$_{NIR}$ and low sheet resistance, and therefore a high FOM approximately between 18 and 25.

For applications where a high SF is desired one can modulate the transmission by carefully choosing the insulating materials properties. For example, materials with large real and imaginary parts of the dielectric function, like amorphous silicon (a-Si) or amorphous SiC, possess a relatively high refractive index and absorption in the visible spectral range that allows to have a low transmission without strongly affecting the reflectance and, therefore, obtain a good SF. In order to meet the condition for the plasmon-polariton effect, $\varepsilon_1^M + \varepsilon_1^I < 0$, the spectral region for the T$_{NIR}$ is of importance, for example, a-Si may not be preferred for plasmon tunneling in the visible spectral range but absorption decreases for increasing wavelength as transitioning from the visible to the near infrared spectrum, therefore plasmon tunneling for this case becomes more efficient for longer wavelengths because the plasmon-polariton condition is met and the insulator layer absorption is lower. This is in contrast to a structure without a resonating cavity since at longer wavelengths the transmission decreases continuously with increasing wavelength according to the Hagen-Rubens equation $$R \approx 1 - 2\sqrt{\frac{2\varepsilon_0 \omega}{\sigma}}.$$

Figure 21:
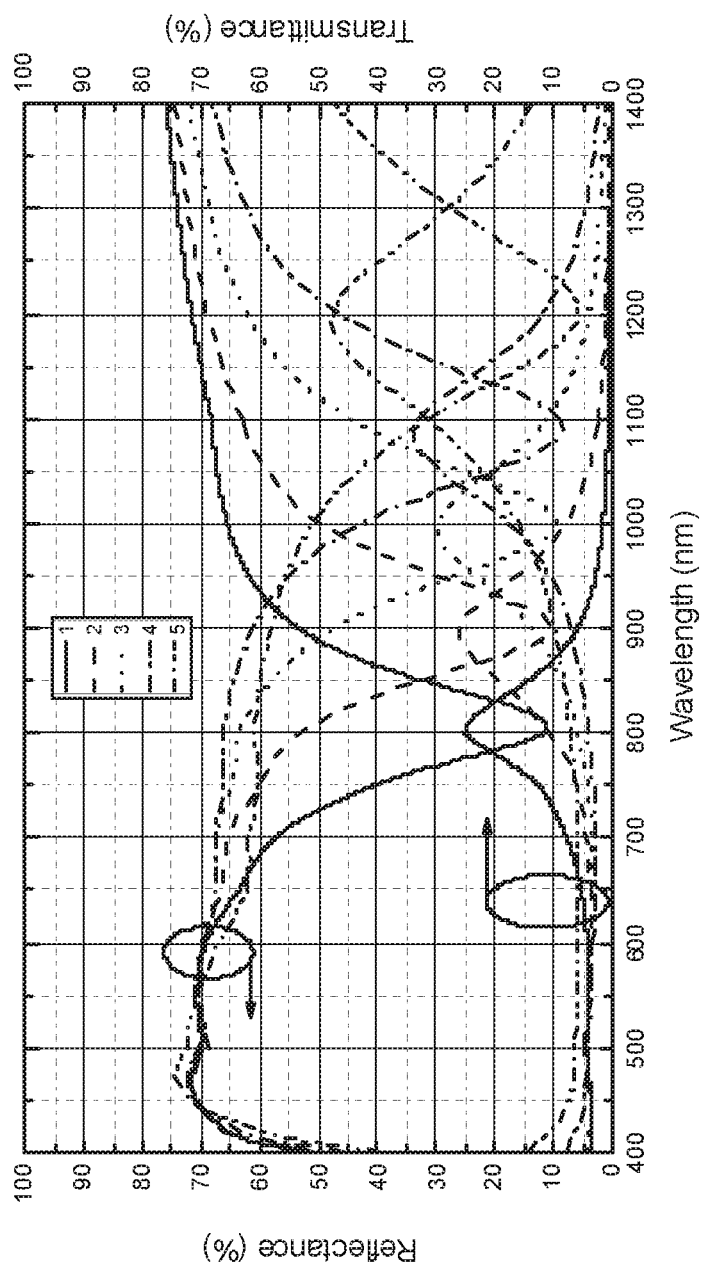
FIG. 21 is a plot of a transmission and reflectance spectra for an exemplary transflective coating in an electro-optic assembly.

Amorphous Si has a very high refractive index that enables a resonator with a very wide high reflectance spectral range and, therefore, it is possible to obtain a T$_{NIR}$ deeper at longer wavelengths by increasing the FWOT of the resonator cavity. For example, FIG. 21 shows the transmission and reflectance spectra of different MIMI stacks in an electro-optic assembly 14 with a constant reflectance of 70% but with a continuously tunable $\lambda_{NIR}$ between 800 and 1200 nm. The performance and thickness parameters are shown in Table 26 shown in FIG. 22. It is possible to see that this structure is capable of tuning the $\lambda_{NIR}$ over a wide spectral range while maintaining a reasonable reflected color, but more interesting are the high values that are obtainable for the SF and FOM, above 11 and above 13 (%*sq/Ohm), respectively. It is also possible to see that the FWOT of the resonator cavity increases to values up to 0.63, and that the change in color with angle of incidence becomes more stable for structures with higher $\lambda_{NIR}$.

Figure 23:
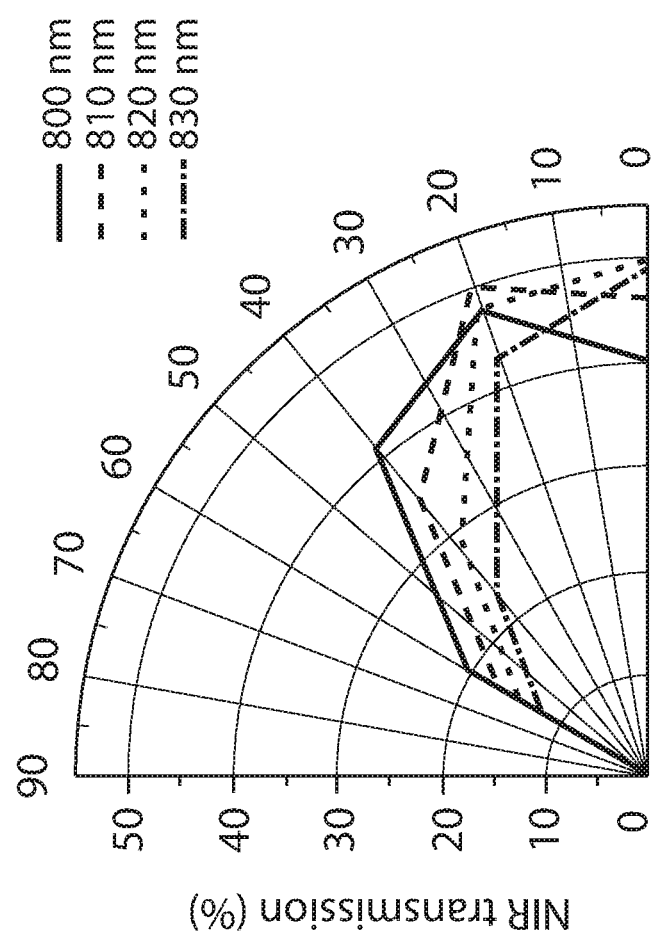
FIG. 23 is a graphical depiction of an exemplary transflective coating demonstrating directional filtering.

FIG. 23 depicts even a further aspect of the disclosure, which is the directional characteristic of MIM based structures regarding the directional filtering. It is possible to see that the full width at half maximum (FWHM) occurs at an angle of incidence of approximately of 45 to 50 deg.

Figure 24:
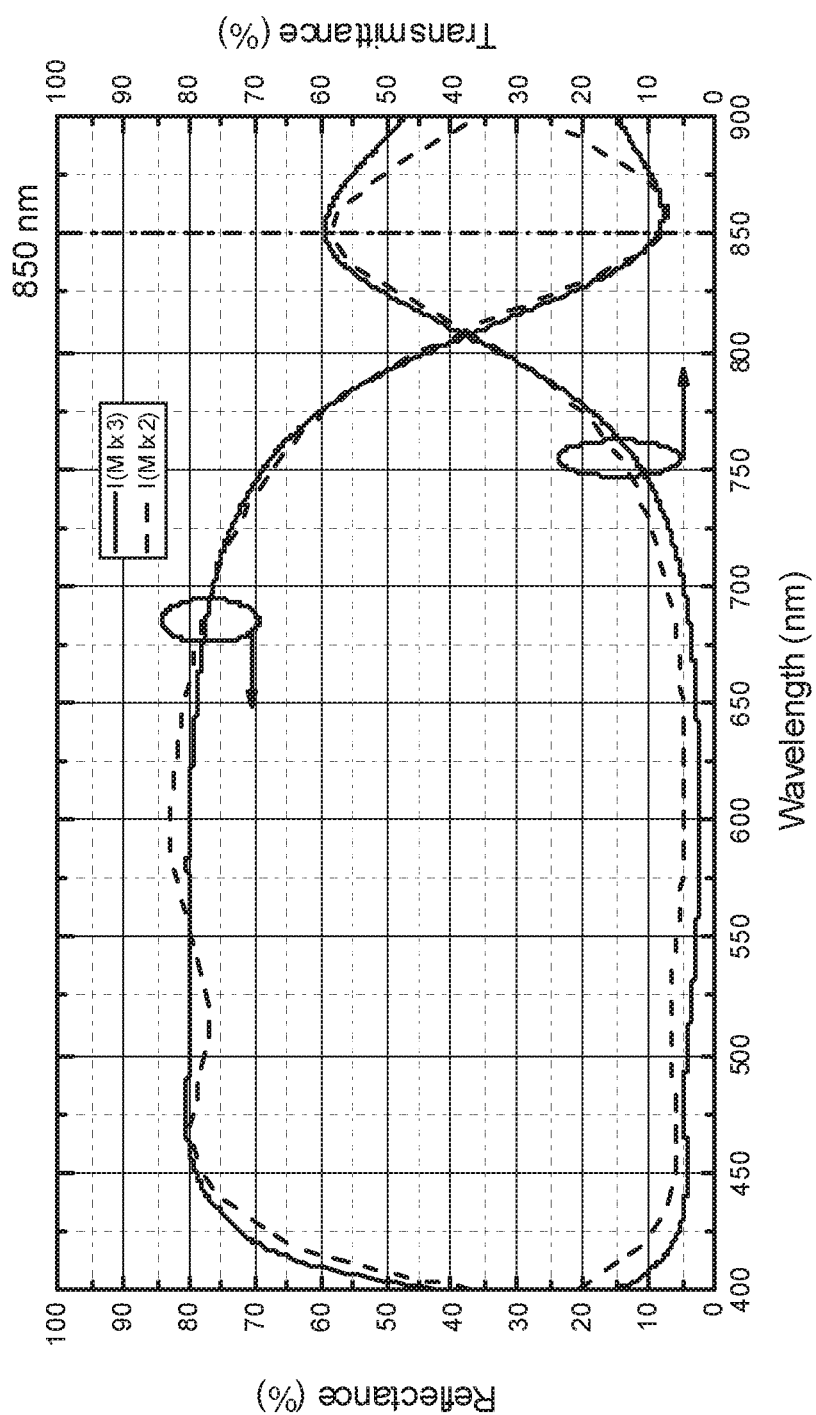
FIG. 24 is a plot of a transmission and reflectance spectra for an exemplary transflective coating in an electro-optic assembly in accordance with the disclosure.

In another aspect, the disclosure may provide for the capability of MIM structures to stack more than one resonator forming stack with structures I(MI×n) or (MI×n)I, where n is an integer number and represents the number of resonating cavities. Such stacks may further decrease the sheet resistance and further increase the SF. Furthermore several resonators may be stacked to further reduce the sheet resistance and increase the FOM. FIG. 24 depicts the transmission and reflectance spectra for a I(MI×3) and for a I(MI×2) structures with a $\lambda_{NIR}$ of 850 nm, with FOM values of 34 and 31% sq/Ohm, respectively.

Referring back to each of the various embodiments discussed herein, the disclosure provides for a number of configurations of the electro-optic assembly 14. Examples of the electro-optic assembly are demonstrated in each of FIGS. 1, 2, 4A, 4B, 5, 9, 10, and 11. Each of the configurations of the electro-optic assembly 14 may have a number of elements that may be used in a particular embodiment or in combination with various other embodiments discussed herein. Each of the embodiments discussed herein may further be configured to provide operating characteristics that may improve operation of the electro-optic assembly 14. For example, one or more of the disclosed embodiments of the electro-optic assembly 14 may provide for transmittance in the NIR range from approximately 800 nm to 1000 nm. The wavelengths in the NIR range may be transmitted with an efficiency that may be greater than 30% in some embodiments and may be greater than 50% in some embodiments. Additionally, the transmittance through the electro-optic assembly 14 in the NIR range may be greater than a transmittance of the electro-optic assembly 14 in the visible range (e.g. approximately 400 nm to 700 nm). In some embodiments, the transmittance in the NIR range through the electro-optic assembly 14 may be 1.5 times greater or even 2 times than the transmittance of light in the visible range.

In various embodiments, the electro-optic assembly 14 may further be configured to have a visible reflectance between 40% and 75%. In some embodiments, the visible reflectance of the electro-optic assembly 14 may range from 45% to 70%, and in some embodiments, the visible reflectance may range from 50% to 65%. In some of the embodiments, the visible reflectance of the electro-optic assembly 14 may further have a neutral reflected color that does not substantially change the color of the reflected light. In some embodiments, the performance of the electro-optic assembly 14 may include a* and b* between −5 and 5 or may include C* less than 15, less than 10, or less than 5. Additionally, some embodiments of the electro-optic assembly 14 may be operable to have significant color stability at an angle up to 30 degrees wherein the delta C* with angle is less than 15, less than 10 or less than 5. In some embodiments, the electro-optic assembly 14 may have color stability up to 45 degrees or even up to 60 degrees.

In general, the transflective element 62 of the electro-optic assembly 14 may comprise a sheet resistance ranging from 50Ω/□ to 500Ω/□. In some embodiments, the sheet resistance of the transflective element 62 may be less than 50Ω/□, less than 15Ω/□, or less than 10Ω/□. In some embodiments, the sheet resistance of the transflective element 62 may be from 9Ω/□ to 15Ω/□. Accordingly, the FOM of the transflective layer may be greater than 5 and in some embodiments the FOM may be greater than 10 or greater than 20. Also, as previously discussed, a high Stealth Factor (SF) may also be beneficial to limit the visibility of the image sensor 16 behind the electro-optic assembly 14. Accordingly, some of the embodiments of the electro-optic assembly 14 discussed herein may have an SF greater than 1.2, greater then 5, or even greater than 10. In various embodiments, the disclosure provides for an improved electro-optic assembly operable to achieve the performance characteristics discussed herein while also improving a manufacturing process efficiency and limiting a manufacturing cost by incorporating the transflective element 62 on the third surface 44a.

Referring again to FIG. 2, in some embodiments, the mirror element 34 may be an electro-chromic element or an element such as a prism. One non-limiting example of an electro-optic medium 48 in an electrochromic medium, which includes at least one solvent, at least one anodic material, and at least one cathodic material. Typically, both of the anodic and cathodic materials are electroactive and at least one of them is electrochromic. It will be understood that regardless of its ordinary meaning, the term "electroactive" will be defined herein as a material that undergoes a modification in its oxidation state upon exposure to a particular electrical potential difference. Additionally, it will be understood that the term "electrochromic" will be defined herein, regardless of its ordinary meaning, as a material that exhibits a change in its extinction coefficient at one or more wavelengths upon exposure to a particular electrical potential difference. Electrochromic components, as described herein, include materials whose color or opacity are affected by electric current, such that when an electrical current is applied to the material, the color or opacity changes from a first phase to a second phase. The electrochromic component may be a single-layer, single-phase component, multi-layer component, or multi-phase component, as described in U.S. Pat. No. 5,928,572 entitled "Electrochromic Layer and Devices Comprising Same," U.S. Pat. No. 5,998,617 entitled "Electrochromic Compounds," U.S. Pat. No. 6,020,987 entitled "Electrochromic Medium Capable of Producing a Pre-selected Color," U.S. Pat. No. 6,037,471 entitled "Electrochromic Compounds," U.S. Pat. No. 6,141,137 entitled "Electrochromic Media For Producing a Pre-selected Color," U.S. Pat. No. 6,241,916 entitled "Electrochromic System," U.S. Pat. No. 6,193,912 entitled "Near Infrared-Absorbing Electrochromic Compounds and Devices Comprising Same," U.S. Pat. No. 6,249,369 entitled "Coupled Electrochromic Compounds With Photostable Dication Oxidation States," U.S. Pat. No. 6,137,620 entitled "Electrochromic Media With Concentration Enhanced Stability, Process For The Preparation Thereof and Use in Electrochromic Devices," and U.S. Pat. No. 6,519,072, entitled "Electrochromic Device"; and International Patent Application Publication Nos. WO 1998/42796 entitled "Electrochromic Polymeric Solid Films, Manufacturing Electrochromic Devices Using Such Solid Films, and Processes for Making Such Solid Films and Devices," and WO 1999/02621 entitled "Electrochromic Polymer System," which are herein incorporated by reference in their entirety.

The present disclosure may be used with a mounting system, such as that described in U.S. Pat. Nos. 8,814,373; 8,201,800; 8,210,695; 9,174,577; 8,925,891; 8,960,629; 9,244,249; and 9,838,653; and U.S. Provisional Patent Application No. 61/704,869, which are hereby incorporated herein by reference in their entirety. Further, the present disclosure may be used with a rearview packaging assembly, such as that described in U.S. Pat. Nos. 8,814,373; 8,646,924; 8,643,931; 8,264,761; 8,885,240 and 9,316,347; and U.S. Provisional Patent Application No. 61/707,625, which are hereby incorporated herein by reference in their entirety. Additionally, it is contemplated that the present disclosure can include a bezel, such as that described in U.S. Pat. Nos. 8,827,517; 8,210,695; and 8,201,800, which are hereby incorporated herein by reference in their entirety.

It will be appreciated that embodiments of the invention described herein may be comprised of one or more conventional processors and unique stored program instructions that control one or more processors to implement, in conjunction with certain non-processor circuits, some, most, or all of the functions of a mirror assembly 12, as described herein. The non-processor circuits may include, but are not limited to signal drivers, clock circuits, power source circuits, and/or user input devices. As such, these functions may be interpreted as steps of a method used in using or constructing a classification system. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, the methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. An electro-optic assembly, comprising:
a first substrate comprising a first surface and a second surface;
a second substrate comprising a third surface and a fourth surface, wherein the first substrate and the second substrate form a cavity between the second surface and the third surface;
an electro-optic medium disposed in the cavity;
a transparent, electrically conductive layer disposed on the second surface; and
a transflective element disposed on the third surface, wherein the transflective element comprises a plurality of alternating layers comprising a first metal layer stacked adjacent to a first insulator layer, and a second metal layer also adjacent to the first insulator layer to create a metal-insulator-metal (MIM) stack, wherein the transflective element is configured to reflect light in a visible spectrum and transmit light in a near infrared (NIR) spectrum, wherein the transflective element has a figure of merit (FOM) greater than 5, wherein the FOM is defined as a ratio of a transmission through the transflective element at normal incidence over the NIR spectrum to a sheet resistance of the transflective element.

2. The assembly according to claim 1, wherein the transflective element is further configured to have a sheet resistance less than 15Ω/□.

3. The assembly according to claim 1, wherein the electro-optic media is an electrochromic media.

4. The assembly according to claim 1, further comprising a second insulator layer disposed between the first metal layer and the electrochromic medium forming metal-insulator-metal-insulator (MIMI) stack.

5. The assembly according to claim 1, further comprising a second insulator layer disposed between the second metal layer and the second substrate forming an insulator-metal-insulator-metal (IMIM) stack.

6. The assembly according to claim 1, wherein the transflective element comprises a maximum color variation ($\Delta C^*_{max}$) from 0° to 45° that is less than 15.

7. The assembly according to claim 1, wherein the first insulator layer is formed of a combination of different insulator materials, each of the different insulator materials comprising a plurality of layers of insulating materials with high and low index of refraction.

8. The assembly according to claim 1, further comprising a resonating cavity formed by the plurality of alternating layers, wherein the visible reflectance is greater than 55%.

9. The assembly according to claim 1, wherein an average transmittance of the NIR spectrum through the transflective element is greater than 40%.

10. The assembly according to claim 1, wherein the full wave optical thickness (FWOT) of the transflective element is between about 0.4 and 0.7.

11. The assembly according to claim 1, wherein the MIM stack comprises a product of the dielectric functions $\varepsilon_1^M \varepsilon_1^I$ of the metal and the insulator of the MIM stack is less than zero ($\varepsilon_1^M \varepsilon_1^I < 0$), such that one of $\varepsilon_1^M$ and $\varepsilon_1^I$ is a positive dielectric function and the other is a negative dielectric function, wherein an absolute value of the positive dielectric function is lower than the negative dielectric function ($\varepsilon_1^M + \varepsilon_1^I < 0$).

12. The assembly according to claim 11, wherein the metal comprises silver.

13. An electro-optic assembly, comprising:
   a first substrate comprising a first surface and a second surface;
   a second substrate comprising a third surface and a fourth surface, wherein the first substrate and the second substrate form a cavity between the second surface and the third surface;
   an electro-optic medium disposed in the cavity;
   a transparent, electrically-conductive layer disposed on the second surface; and
   a transflective element disposed on the third surface, wherein the transflective element comprises:
      a stack of layers comprising a plurality of alternating layers of high and low refractive index; and
      at least one electrically conductive layer,
   wherein the transflective element is configured to transmit at least 20% of light in a visible spectrum from 400 nm to 700 nm and transmit light in a near infrared (NIR) spectrum and a ratio of the near infrared (NIR) transmittance in the NIR spectrum from 780 nm to 830 nm to the visible transmittance in the visible spectrum from 400 nm to 700 nm of the electro-optic assembly is greater than 1.5.

14. The electro-optic assembly according to claim 13, wherein at least one of the electrically conductive and a high index layer of the alternating layers of high and low refractive index comprises a transparent conducting oxide (TCO).

15. The electro-optic assembly according to claim 13, wherein the electrically conductive layer comprises a metal layer.

16. The electro-optic assembly according to claim 15, wherein the metal layer is disposed between the stack of layers and the electro-optic medium.

17. The electro-optic assembly according to claim 16, wherein the metal layer comprises silver.

18. The electro-optic assembly according to claim 13, further comprising a semiconductor layer disposed within the stack of layers.

19. An electro-optic assembly, comprising:
   a first substrate comprising a first surface and a second surface;
   a second substrate comprising a third surface and a fourth surface, wherein the first substrate and the second substrate form a cavity between the second surface and the third surface;
   an electro-optic medium disposed in the cavity;
   a transparent, electrically-conductive layer disposed on the second surface; and
   a transflective element disposed on the third surface, wherein the transflective element comprises:
      a stack of layers comprising a plurality of alternating layers of high and low refractive index; and
      at least one electrically conductive layer,
   wherein the transflective element is configured to reflect light in a visible spectrum and transmit light in a near infrared (NIR) spectrum and the light reflected in the visible spectrum from the transflective element comprises a maximum color variation ($\Delta C^*_{max}$) from 0° to 45° that is less than 15.

* * * * *